United States Patent
Vemu et al.

(10) Patent No.: US 10,466,926 B1
(45) Date of Patent: Nov. 5, 2019

(54) EFFICIENT SCHEME FOR REVERSING IMAGE DATA IN A MEMORY BUFFER

(71) Applicant: Ambarella, Inc., Santa Clara, CA (US)

(72) Inventors: Sri Sailaja Vemu, Santa Clara, CA (US); Sameer M. Gauria, Ithaca, NY (US)

(73) Assignee: Ambarella, Inc., Santa Clara, CA (US)

( * ) Notice: Subject to any disclaimer, the term of this patent is extended or adjusted under 35 U.S.C. 154(b) by 171 days.

(21) Appl. No.: 15/615,150

(22) Filed: Jun. 6, 2017

Related U.S. Application Data

(60) Provisional application No. 62/492,435, filed on May 1, 2017.

(51) Int. Cl.
 *G06F 3/06* (2006.01)
 *H04N 21/426* (2011.01)
 *G06T 15/04* (2011.01)

(52) U.S. Cl.
 CPC .......... *G06F 3/0656* (2013.01); *G06T 15/04* (2013.01); *H04N 21/42615* (2013.01); *G09G 2340/02* (2013.01)

(58) Field of Classification Search
 None
 See application file for complete search history.

(56) References Cited

U.S. PATENT DOCUMENTS

| 2017/0069072 A1* | 3/2017 | Sano ............... H04N 13/246 |
| 2017/0076460 A1* | 3/2017 | Yamada ............ G06T 7/593 |
| 2018/0091798 A1* | 3/2018 | Chang ............. H04N 13/271 |
| 2018/0130220 A1* | 5/2018 | Goldentouch ...... G06T 1/0007 |

OTHER PUBLICATIONS

Arndt, Oliver Jakob, et al. "Parallel implementation of real-time semi-global matching on embedded multi-core architectures." 2013 International Conference on Embedded Computer Systems: Architectures, Modeling, and Simulation (SAMOS). IEEE, 2013.*
Heinrichs, Matthias, Volker Rodehorst, and Olaf Hellwich. "Efficient semi-global matching for trinocular stereo." differences (SSD) 2.1 (2007): 1.*
Wang, Wenqiang, et al. "Real-time high-quality stereo vision system in FPGA." IEEE Transactions on Circuits and Systems for Video Technology 25.10 (2015): 1696-1708.*

(Continued)

*Primary Examiner* — Ryan M Gray
(74) *Attorney, Agent, or Firm* — Christopher P. Maiorana, PC

(57) ABSTRACT

An apparatus comprising a plurality of image sensors configured to capture an image and a processor. The processor may comprise a buffer. The processor may be configured to (i) receive data from the image in a sequential order, (ii) perform cost calculations on the data, (iii) store the data in the buffer in a direction, (iv) when data corresponding to an end of a line of pixels of the image is stored, perform a second cost calculation on the stored data corresponding to the line and (v) reverse the direction of storing the data in the buffer. An order for the second cost calculations on the line of the data may be last in, first out. The data may be stored while the second cost calculations are performed. Data may not be removed from the buffer until the second cost calculation has been performed on the data.

17 Claims, 10 Drawing Sheets

(56) References Cited

OTHER PUBLICATIONS

Hernandez-Juarez, Daniel, et al. "Embedded real-time stereo estimation via semi-global matching on the GPU." Procedia Computer Science 80 (2016): 143-153.*

D. Hernandez-Juarez et al., "Embedded real-time stereo estimation via Semi-Global Matching on the GPU", Procedia Computer Science, vol. 80, 2016, pp. 143-153.

* cited by examiner great utility when implementing computer vision. One implementation of stereo reconstruction involves computing costs along multiple 1-D paths towards each pixel. Processing an image in order takes advantage of a recurrence relation that defines each cost. However, one cost will be calculated along a path opposite to the order the pixels are presented. A memory buffer can be used to store pixels to calculate the path opposite to the order the pixels are presented.

EFFICIENT SCHEME FOR REVERSING IMAGE DATA IN A MEMORY BUFFER

This application relates to U.S. Provisional Application No. 62/492,435, filed May 1, 2017, which is hereby incorporated by reference in its entirety.

FIELD OF THE INVENTION

The invention relates to video processing generally and, more particularly, to a method and/or apparatus for implementing an efficient scheme for reversing image data in a memory buffer.

BACKGROUND

Stereo reconstruction is a process of estimating distance from a camera using a pair of 2D images. Two images can be taken that are a known, small, distance apart (i.e., a few centimeters) by using a pair of camera sensors. Video analysis can be implemented to detect various objects in images. By quantifying the small differences in position of various objects between the 2 images the distance of various objects can be estimated. Objects that have a smaller change in position between the two images are determined to be far away. Objects that have larger changes in position between the two images are closer to the camera.

Efficiently performing stereo reconstruction is of great utility when implementing computer vision. One implementation of stereo reconstruction involves computing costs along multiple 1-D paths towards each pixel. Processing an image in order takes advantage of a recurrence relation that defines each cost. However, one cost will be calculated along a path opposite to the order the pixels are presented. A memory buffer can be used to store pixels to calculate the path opposite to the order the pixels are presented.

In hardware implementation, it is important to find solutions that use as little hardware as possible, without loss in performance and output rate. One solution may implement a two line memory buffer where the data is written to one line while data is read out on the other line. A two line memory buffer solution has a larger memory hardware requirement.

It would be desirable to implement an efficient scheme for reversing image data in a memory buffer.

SUMMARY

The invention concerns an apparatus comprising a plurality of image sensors and a processor. The plurality of image sensors may each be configured to capture an image. The processor may comprise a memory buffer. The processor may be configured to (i) receive pixel data from the image in a sequential order, (ii) perform a plurality of first cost calculations on the received pixel data, (iii) store the received pixel data in the memory buffer in a direction, (iv) when pixel data corresponding to an end of a line of pixels of the image is stored, perform a second cost calculation on each of the stored pixel data corresponding to the line and (v) reverse the direction of storing the received pixel data in the memory buffer. An order for the second cost calculations on the line of the stored pixel data may be last in, first out. The received pixel data may be stored while the second cost calculations are performed. Stored pixel data may not be removed from the memory buffer until the second cost calculation has been performed on the stored pixel data.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing an efficient scheme for reversing image data that may (i) implement a reversing memory buffer, (ii) reduce an amount of hardware for implementation, (iii) buffer pixel data to enable cost calculations on a 180 degree path, (iv) provide depth information for computer vision, (v) receive pixel data in a raster scan order, (vi) store derived per-pixel values and/or (vii) be implemented as one or more integrated circuits.

Figure 1:
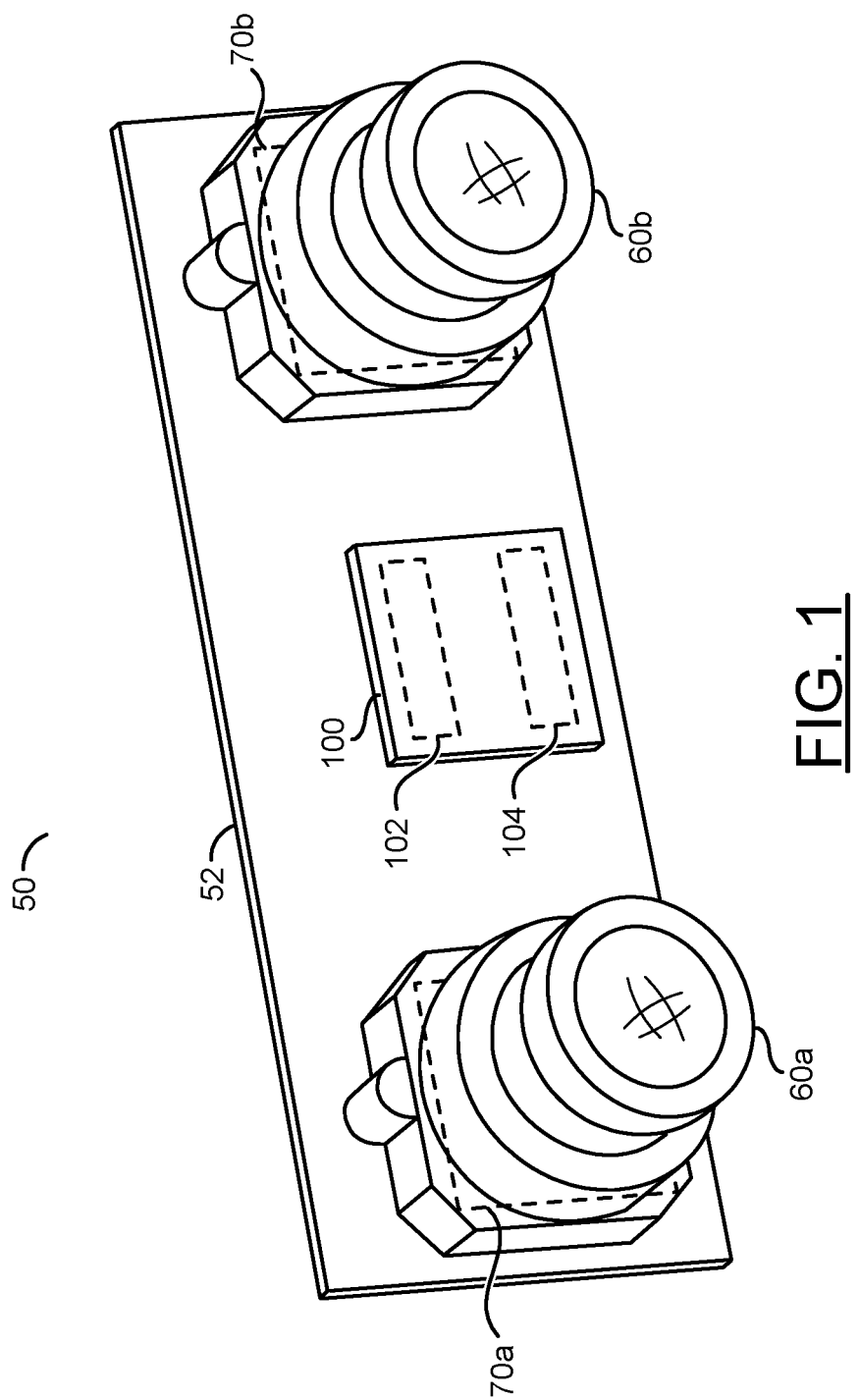
FIG. 1 is a diagram illustrating a context of the invention.

Referring to FIG. 1, a diagram illustrating a context of the invention is shown. A camera module 50 is shown. In an example, the camera module 50 may implement a stereo camera. The camera module 50 may comprise a circuit board (e.g., a PCB) 52 implementing various components. The circuit board 52 may comprise lenses 60a-60b, camera sensors 70a-70b and/or a block (or circuit) 100. The camera sensors 70a-70b are shown behind the lenses 60a-60b. The circuit 100 may implement a processor. The camera module 50 may comprise other components (not shown). The components and/or layout of the components of the camera module 50 may be varied according to the design criteria of a particular implementation.

The camera module 50 implement a camera system. In some embodiments, the camera module 50 may be implemented as a drop-in solution (e.g., installed as one component). In an example, the camera module 50 may be a device that may be installed as an after-market product for a vehicle (e.g., a retro-fit for the vehicle 50). The number and/or types of signals and/or components implemented by the camera module 50 may be varied according to the design criteria of a particular implementation.

In some embodiments, the processor 100 may implement a system-on-chip (SoC). The processor 100 may comprise a block (or circuit) 102 and/or a block (or circuit) 104. The circuit 102 may be configured as an interface. The circuit 104 may be configured as a pipeline. Details of the processor 100 may be described in association with FIG. 2.

The processor 100 may be configured to perform stereo reconstruction. In one example, the processor 100 may implement semi-global matching (SGM) to perform stereo reconstruction. Semi-global matching may implement a dense stereo matching that may be used for 3D reconstruction of image. Stereo reconstruction and/or semi-global matching may be implemented to perform computer vision.

The processor 100 may implement stereo reconstruction to estimate distance from the camera module 50. For example, the camera module 50 may capture a pair of 2D images using the lenses 60a-60b and/or the camera sensors 70a-70b (e.g., a stereo pair of images). The lenses 60a-60b may be a known (e.g., pre-determined) distance apart. For example, the distance between the lenses 60a-60b may be a small distance (e.g., a few centimeters). The processor 100 may be configured to perform video analytics to detect objects in the captured video (e.g., the images). The processor 100 may be configured to quantify small differences in position of various detected objects between the two images captured by the camera sensors 70a-70b. The processor 100 may be configured to estimate the distance between the detected objects captured in the video. In one example, the less the object changes position between the two captured images, the farther away the detected object may be from the camera module 50. In another example, the more the object changes position between the two captured images, the closer the detected object may be from the camera module 50.

Semi-global matching may be one implementation of stereo reconstruction performed by the processor 100. Implementing semi-global matching to estimate the distances of objects detected in video signals using may be useful for implementing computer vision. For example, computer vision may be used in applications such as self-driving cars to determine how far away various objects like other cars, poles, pedestrians and/or obstacles are compared to a vehicle. The processor 100 may be configured to perform stereo reconstruction given a pair of suitably pre-processed input images.

Figure 2:
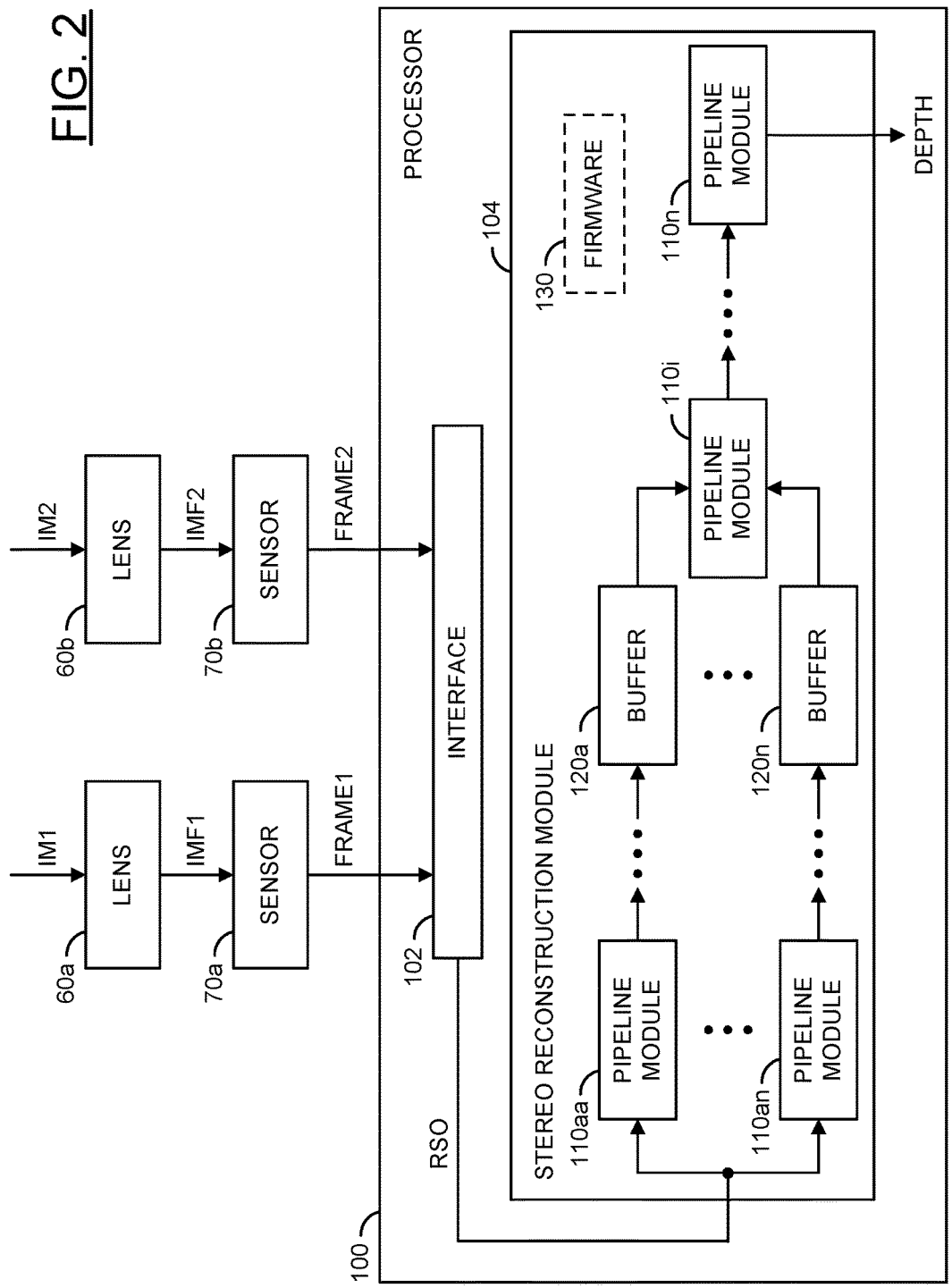
FIG. 2 is a block diagram of an embodiment of the invention.

Referring to FIG. 2, a block diagram illustrating an embodiment of the invention is shown. The camera module generally comprises the lenses 60a-60b, the image sensors 70a-70b and/or the processor 100. The processor 100 may comprise the interface 102 and/or the pipeline 104. The pipeline 104 may implement a stereo reconstruction module. In some embodiments, the processor 100 may be implemented as a video processor. The processor 100 may comprise other components (not shown). For example, the processor 100 may comprise a memory, a video analytics module, an output interface, etc. The number of components and/or layout of the components of the processor 100 may be varied according to the design criteria of a particular implementation.

The lenses 60a-60b may capture signals (e.g., IM1-IM2). The signals IM1-IM2 may be used to generate an image (e.g., an analog image) of the environment near the camera module 50 (e.g., within a field of view) when presented by the lenses 60a-60b to the sensors 70a-70b as the signals IMF1-IMF2. For example, the signals IM1-IM2 may be light received from the environment. The lenses 60a-60b may be implemented as an optical lens. The lenses 60a-60b may provide a zooming feature and/or a focusing feature. The sensors 70a-70b and/or the lenses 60a-60b may be implemented, in one example, as a single lens assembly. Generally, the camera sensors 70a-70b are located behind a corresponding one of the lenses 60a-60b.

The sensors 70a-70b may be configured to capture image data for video (e.g., the signals IMF1-IMF1 from the lenses 60a-60b). The sensors 70a-70b may capture data received through the lenses 60a-60b to generate bitstreams (e.g., generate video frames). For example, the sensors 70a-70b may receive focused light (e.g., IMF1-IMF2) from the lenses 60a-60b. The lenses 60a-60b may be directed, tilted, panned, zoomed and/or rotated to provide a targeted view of the environment. The sensors 70a-70b may generate signals (e.g., FRAME1-FRAME2). The signals FRAME1-FRAME2 may be video data (e.g., a sequence of video frames and/or images). The signals FRAME1-FRAME2 may be presented to the processor 100.

The sensors 70a-70b may transform the received focused light signals IMF1-IMF2 into digital data (e.g., the bitstreams FRAME1-FRAME2). In some embodiments, the sensors 70a-70b may perform an analog to digital conversion. For example, the sensors 70a-70b may perform a photoelectric conversion of the focused light received from the lenses 60a-60b. The sensors 70a-70b may transform the bitstreams into video data, video files and/or video frames. In some embodiments, the video data generated by the sensors 70a-70b may be uncompressed and/or raw data generated in response to the focused light from the lenses 60a-60b. In some embodiments, the video data may be digital video signals. The video signals may comprise video frames.

In some embodiments, the video data may be encoded at a high bitrate. For example, the signal may be generated using a lossless compression and/or with a low amount of lossiness. In some embodiments, the video data captured by the sensors 70a-70b may be presented to the processor 100. The processor 100 may encode the video data captured by the sensors 70a-70b to generate video data that may be output as a video signal and/or may be in a format compatible with performing video analytics (e.g., to detect and/or recognize objects in the video data).

In one example, the sensors 70a-70b may be implemented as complementary metal-oxide-semiconductor (CMOS) sensors. The sensors 70a-70b may comprise camera processor/logic, and/or a memory buffer. The camera sensors 70a-70b may each receive light focused by a corresponding one of the lenses 60a-60b and transform the light into digital data (e.g., the bitstreams). In some embodiments, the sensors 70a-70b may be an oversampled binary image sensor. In some embodiments, the sensors 70a-70b may be a rolling shutter sensor.

In one example, the lens 60a may receive a light signal (e.g., IM1) from the environment. The lens 60a may focus the light IM1 on the sensor 70a. The sensor 70a may receive focused light (e.g., the signal IMF1) from the lens 60a. The camera sensor 70a may perform a photoelectric conversion of the light from the lens 60a. The sensor 70a may transform the focused light IMF1 to the bitstream (e.g., video data, video frames, etc.) FRAME1. The logic implemented by the sensor 70a may transform the bitstream into human-legible content (e.g., video data with visual content). For example, the processor 100 may be configured to perform video analytics on video data in a format that is human-legible (e.g., the visual content of the video data). For example, the logic of the sensor 70a may receive pure (e.g., raw) data from the camera sensor 70a and generate video data based on the raw data (e.g., the bitstream). The memory buffer of the camera sensor 70a may store the raw data and/or the processed bitstream. The lens 60b and the sensor 70b may have a similar implementation.

The processor 100 may be configured to execute computer readable code and/or process information. The processor 100 may be configured to receive input and/or present output. The processor 100 may be configured to receive the signal FRAME1 and/or the signal FRAME2. The processor 100 may be configured to present and/or receive other signals (not shown). The number and/or types of inputs and/or outputs of the processor 100 may be varied according to the design criteria of a particular implementation.

The processor may be configured to receive video data (e.g., the signals FRAME1-FRAME2), process video data and/or output video data. The output video may be an encoded, cropped, stitched and/or enhanced version of one or more of the signals FRAME1-FRAME2. In an example, the processor 100 may generate encoded and/or compressed (e.g., using H.264, using H.265, using VP8, using VP9, etc.) video data. The processor 100 may be configured to generate output video that may be visual content viewable by a person on a display. The output video may be high resolution, digital, encoded, de-warped, stabilized, cropped, blended, stitched and/or rolling shutter effect corrected.

The video analytics performed by the processor 100 may comprise analyzing, understanding and/or interpreting digital video to produce numerical and/or symbolic information about the digital video. The numerical and/or symbolic information may be used for interpreting visual information of the digital video. In an example, the intelligent video analytics may comprise computer vision.

In some embodiments, the processor 100 may be configured to extract data (e.g., the numerical and/or symbolic information) from the video frames. The extracted data may be used to determine the visual content of the video frames. Determining the visual content may comprise recognizing objects. In one example, the processor 100 may interpret the numerical and/or symbolic information to recognize that the visual data represents a particular object (e.g., a vehicle, a person, an animal, a sign, etc.). In some embodiments, the number of pixels and/or the colors of the pixels of the video data may be used to recognize portions of the video data as objects. The types of objects recognized by the processor 100 may be varied according to the design criteria of a particular implementation.

The processor 100 may be configured to encode and/or compress video data from various sources. In one example, the processor 100 may receive multiple video signals that provide a portion of a panoramic view. The processor 100 may be configured to crop, blend, synchronize and/or align various signals to generate a panoramic video signal. In some embodiments, the processor 100 may be configured to perform electronic image stabilization (EIS). The processor 100 may perform de-warping on video signals (e.g., to correct warping when the lenses 60a-60b are implemented as wide-angle lenses). The processor 100 may perform intelligent video analytics on the de-warped video frames. The processor 100 may encode video to a particular format.

In some embodiments, the processor 100 may be configured to provide a series of cropped and/or enhanced video frames that improves upon the view captured by the lenses 60a-60b. For example, the processor 100 may be configured to provide night vision. In another example, the processor 100 may be configured to provide High Dynamic Range (HDR) imaging. The processor 100 may be configured to provide more viewing area, highlight detected objects, provide additional data such as a numerical distance to detected objects, provide visual indicators for expected paths, etc.

The video processing functions performed by the processor 100 may be varied according to the design criteria of a particular implementation.

The video and/or data generated by the processor 100 may be stored locally and/or transmitted wirelessly to external storage (e.g., network attached storage, cloud storage, etc.). In an example, the processor 100 may be connected to and/or implement an on-board local memory (e.g., a cache, flash memory, DRAM memory, etc.). In another example, the processor 100 may be stored to a hard-drive of a networked computing device. In yet another example, the processor 100 may be configured to transmit data wirelessly without storage. The type of storage implemented may be varied according to the design criteria of a particular implementation.

The processor 100 may comprise various interfaces to send and/or receive data. In some embodiments, the processor 100 may connect to a wireless communications module. In some embodiments, the processor 100 may be configured with various ports for communication. For example, the processor 100 may implement a hard-wired data port (e.g., a USB port, a mini-USB port, a USB-C connector, a HDMI port, an Ethernet port, a DisplayPort interface, a Lightning port, etc.). In another example, the processor 100 may provide an interface to a wireless data interface (e.g., Wi-Fi, Bluetooth, ZigBee, cellular, etc.).

The interface 102 may be configured to receive the signal FRAME1 and/or the signal FRAME2 from the sensors 70a-70b. In one example, the interface 102 may be implemented as a port. In another example, the interface 102 may be implemented as one or more pins. The interface 102 may be configured to generate a signal (e.g., RSO). The signal RSO may comprise pixels and/or pixel data (e.g., image data) from the images captured by the sensors 70a-70b. In one example, the pixels and/or pixel data of the signal RSO may be in a raster scan order.

The interface 102 of the processor 100 may be configured to enable a transfer of data and/or translation of data from one format to another format to ensure that the data transferred is readable by the intended destination component. In an example, the interface 102 of the processor 100 may comprise a data bus, traces, connectors, wires and/or pins. The interface 102 may comprise one or more components (not shown). In some embodiments, the interface 102 may comprise components (or modules) for performing video analytics. In some embodiments, the interface 102 may be configured to perform pre-processing operations of the images (e.g., FRAME1 and/or FRAME2). The implementation of the interface 102 of the processor 100 may be varied according to the design criteria of a particular implementation.

The pipeline 104 may receive the signal RSO. The pipeline 104 may present a signal (e.g., DEPTH). The signal DEPTH may represent disparity (e.g., the number of pixels of shift between matching points in the left image FRAME1 and the right image FRAME2). The disparity may be proportional to the reciprocal of the actual depth. For example, objects that are far away from the lenses 60a-60b may have low disparity and objects closer to the lenses 60a-60b may have a larger disparity. The signal DEPTH may be used by the processor 100 for determining the distance of an object detected in a video frame from the camera 50.

The pipeline 104 may implement a stereo reconstruction module. The pipeline 104 may be configured to estimate a distance of an object from the lenses 60a-60b using a pair of 2D images (e.g., FRAME1 and FRAME2). The lenses 60a-60b may be a known distance apart (e.g., a few centimeters). The processor 100 may implement video analysis to detect various objects detected in the images. The pipeline 104 may be configured to quantify the small differences in position of various objects between the 2 images. By quantifying the small differences, the pipeline 104 may determine the disparity. Based on the disparity, the distance of various objects from the camera module 50 may be determined.

The pipeline may comprise a number of blocks (or circuits) 110a-110n. The circuits 110a-110n may comprise pipeline modules. The pipeline modules 110a-110n may be configured to perform various functions and/or calculations in a particular order (e.g., a left to right order, as shown in FIG. 2). In an example, the pipeline module 110a may perform a first function (or step) of the pipeline 104, and the pipeline module 110b may perform a next function (or step) of the pipeline 104. In some embodiments, some steps may be performed in parallel (e.g., the pipeline modules 110aa-110an may perform functions in parallel). The number of steps in the pipeline 104 may be varied according to the design criteria of a particular implementation.

The pipeline modules 110a-110n may be configured to perform various operations. In one example, one of the operations performed by one or more of the pipeline modules 110a-110n may comprise a rectification. In another example, one of the operations performed by one or more of the pipeline modules 110a-110n may comprise a mean calculation. In yet another example, one of the operations performed by one or more of the pipeline modules 110a-110n may comprise a path cost calculation. Other operations performed by one or more of the pipeline modules may comprise a sum calculation, a brief descriptor operation, cost cube processing, smoothing, upsampling, etc. The functions and/or operations of the pipeline modules 110a-110n may be varied according to the design criteria of a particular implementation.

The pipeline 104 may comprise blocks (or circuits) 120a-120n. The circuits 120a-120n may be a subset of the pipeline modules 110a-110n. The circuits 120a-120n may implement buffers. In one example, the buffers 120a-120n may be reversible buffers. Generally, pipeline modules 110a-110n perform operations and/or transfer data in one direction (e.g., a left-to-right order). However, the reversible buffers 120a-120n may be configured to perform operations and/or transfer data in multiple directions (e.g., a left-to-right order and/or a right-to-left order). The reversible buffers 120a-120n may be configured to read image data and write image data in opposite directions (e.g., reverse the direction for reading and/or writing image data from one line of the image to the next line of the image). In one example, the reversible buffers 120a-120n may be configured to write data for even rows from address zero (e.g., to a first address) to a maximum address (e.g., a last address) and for odd rows, write data from the maximum address to address zero. In another example, the reversible buffers 120a-120n may be configured to read from even rows from the maximum address to address zero and read from odd rows from address zero to the maximum address. The pipeline 104 may be implemented as a long processing pipeline comprising multiple instances of the reversible buffers 120a-120n.

The pipeline 104 may comprise a block (or circuit) 130. The circuit 130 may implement firmware. The firmware 130 may be configured to provide instructions and/or control bits for controlling the components of the pipeline 104. In one example, the firmware 130 may provide instructions readable by the pipeline modules 110a-110n to control the input/output and/or flow of information passing through the pipeline 104. In another example, the firmware 130 may provide instructions and/or control bits to configure read and/or write access to the various storage locations of the buffers 120a-120n. The firmware 130 may comprise specialized logic and/or enable communication with other firmware implemented by the processor 100.

Figure 3:
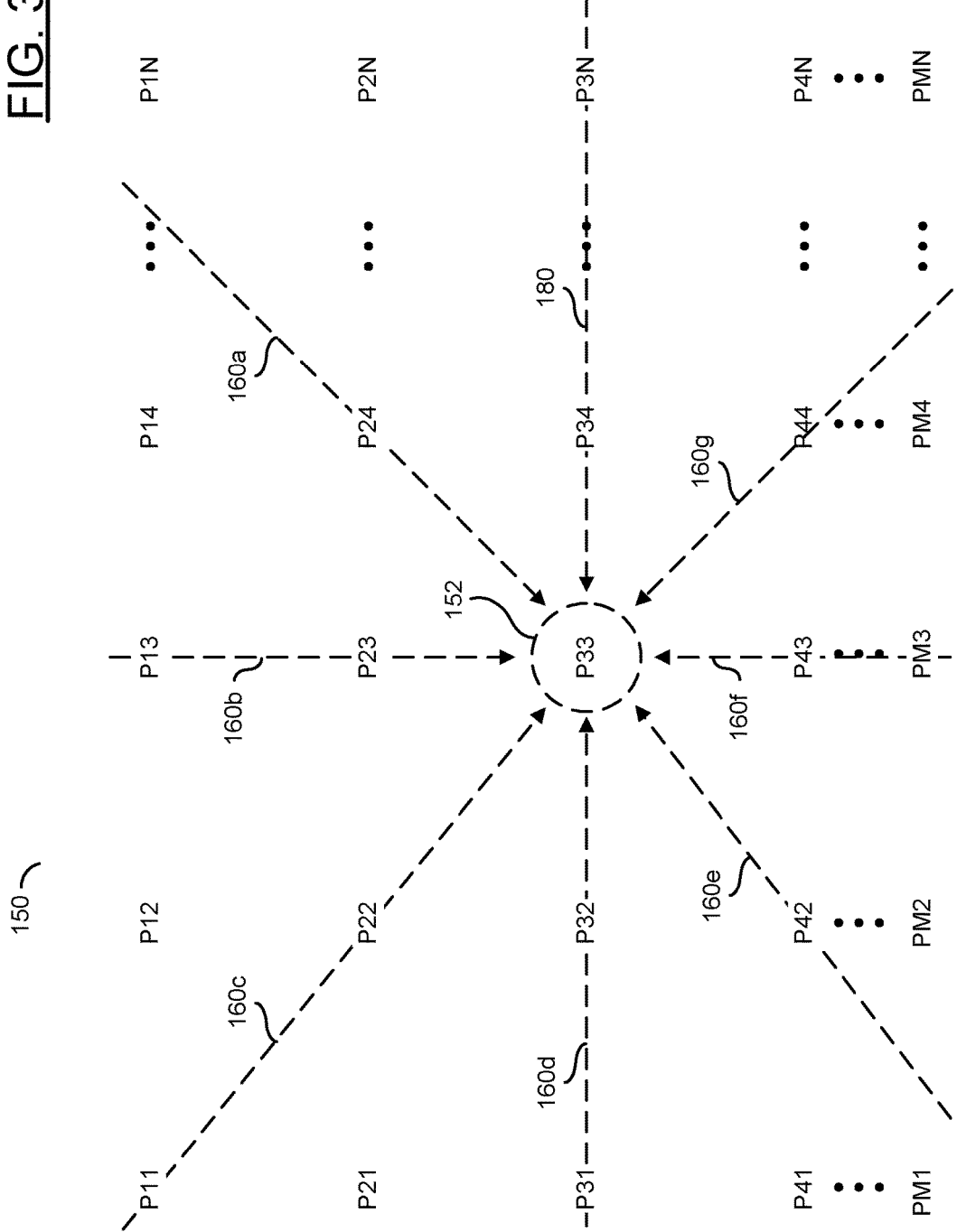
FIG. 3 is a diagram illustrating example cost calculation paths for a pixel of an image.

Referring to FIG. 3, a diagram illustrating example cost calculation paths for a pixel of an image is shown. An example image 150 is shown. The image 150 may comprise a number of pixels P11-PMN. In the example shown, the image 150 may have M rows and N pixels in each row (e.g., N columns). In an example, the pixel P11 may represent the first (e.g., leftmost) pixel of the top row of the image 150 and the pixel P1N may represent the last pixel (e.g., rightmost pixel) of the top row of the image 150. In another example, the pixel P31 may represent the first pixel of the third row of pixels of the image 150 and the pixel P3N may represent the last pixel of the third row of pixels of the image 150. In still another example, the pixel PM1 may represent the first pixel of the last (e.g., bottom) row of pixels of the image 150 and the pixel PMN may represent the last pixel of the last row of pixels of the image 150. The number of pixels P11-PMN in the image 150, the number of rows of pixels and/or the number of columns of pixels may be varied according to the design criteria of a particular implementation.

The interface 102 may present the signal RSO to the pipeline 104. The signal RSO may comprise the pixels P11-PMN and/or data corresponding to the pixels P11-PMN. The pixels P11-PMN may represent image data. The pixels (or image data corresponding to the pixels) P11-PMN may be presented to the pipeline 104 in a particular order. In one example, the pixels (or data corresponding to the pixels) P11-PMN may be presented in a raster scan order. The raster scan order may present the pixels in an order (e.g., from left to right in each row and from top to bottom). In one example, the pixel P11 may be presented, then the pixel P12, then the pixel P13, until the end of the first row of pixels (e.g., the pixel P1N) is presented. Then the next row of pixels may be presented starting with the pixel P21, then the pixel P22, then the pixel P23, until the end of the second row of pixels (e.g., the pixel P2N) is presented. The raster scan order may be finished when the last pixel of the last row of pixels (e.g., the pixel PMN) is presented.

One of the pixels P11-PMN may be a current pixel 152. The processor 100 may be configured to perform cost calculations corresponding to the current pixel 152. Arrows 160a-160g and/or an arrow 180 are shown directed from an edge of the image 150 towards the current pixel 152. The arrows 160a-160g may represent cost calculation paths for the current pixel 152. In an example, the path 160a may represent a 135 degree path for the current pixel 152, the path 160b may represent a 90 degree path for the current pixel 152, the path 160c may represent a 45 degree path for the current pixel 152, the path 160d may represent a 0 degree path for the current pixel 152, the path 160e may represent a 315 degree path for the current pixel 152, the path 160f may represent a 270 degree path for the current pixel 152 and the path 160g may represent a 225 degree path for the current pixel 152. The arrow 180 may represent a cost calculation path for the current pixel 152. The path 180 may represent a 180 degree path for the current pixel 152. The number of paths and/or angle represented by each of the paths 160a-160g and/or the path 180 may be varied according to the design criteria of a particular implementation.

In the example shown, the pixel P33 may be the current pixel 152. The paths 160a-160g and/or the path 180 may each extend all the way to the end of the image 150 (e.g., the frame). For the current pixel 152, as shown, the paths 160a-160g and/or the path 180 may each be longer than one pixel. The length of the paths 160a-160g and/or the path 180 may be varied based on a distance of the current pixel 152 from the edge of the image 150.

In the example shown, the path 160a may comprise pixel data corresponding to the pixel P33, the pixel P24 and/or the pixel P15. In the example shown, the path 160b may comprise pixel data corresponding to the pixel P33, the pixel P23 and/or the pixel P13. In the example shown, the path 160c may comprise pixel data corresponding to the pixel P33, the pixel P22 and/or the pixel P11. In the example shown, the path 160d may comprise pixel data corresponding to the pixel P33, the pixel P32 and/or the pixel P31. In the example shown, the path 160e may comprise pixel data corresponding to the pixel P33, the pixel P42 and/or the pixel P51. In the example shown, the path 160f may comprise pixel data corresponding to the pixel P33, the pixel P43, the pixel P53, and each pixel in the third column to the edge of the image 150 at the pixel PM3. In the example shown, the path 160g may comprise pixel data corresponding to the pixel P33, the pixel P44, the pixel P55, the pixel P66 and continue until the edge of the image 150 at the pixel PMM (or PNN depending on which of M or N is the smaller value). In the example shown, the path 180 may comprise pixel data corresponding to the pixel P33, the pixel P34, the pixel P35 and each pixel in the third row to the edge of the image 150 at the pixel P3N. The pixels corresponding to each path 160a-160g and/or the path 180 may be varied based on the current pixel 152.

In some embodiments, the pipeline 104 may be configured to reverse image data (e.g., change/reverse a direction of reading and/or writing to the buffers 120a-120n to enable efficient processing and/or efficient use of hardware resources) presented in the raster scan order. In an example, reversing image data presented may be useful when the processor 100 performs stereo reconstruction. The buffers 120a-120n may be implemented to reverse the image data.

In some embodiments, one type of dense stereo reconstruction implemented by the pipeline 104 may be Semi-Global Matching (SGM). The pipeline 104 may implement the SGM approach to approximate an optimal solution by computing costs arising along multiple 1-D paths from eight directions towards each pixel of the image 150. The eight 1-D paths may comprise the paths 160a-160g and/or the path 180 to the current pixel 152.

The pipeline 104 may be configured to calculate the costs (e.g., Lr) along a given path r (e.g., one of the paths 160a-160g and/or the path 180) for each pixel p (e.g., the current pixel 152) and disparity d according to an equation (e.g., EQ1):

$$Lr(p,d)=C(p,d)+\min(Lr(p-r,d),Lr(p-r,d-1)+P1, Lr(p-r,d+1)+P1,\min Lr(p-r,i)+P2)-\min Lr(p-r,k) \quad (EQ1)$$

The cost may be calculated as the sum of the cost of all the paths 160a-160g and/or the path 180. To find the minimum cost at each pixel, the processor 100 may compute each of the 8 directional costs (e.g., costs corresponding for the paths 160a-160g and/or the path 180) across the whole image 150.

Each cost calculation may comprise a recurrence relation (e.g., each cost calculation may be based on previously calculated costs). For example, when pixel data (e.g., image data) is presented in the raster scan order (e.g., from left to right and top to bottom), computing 1-D paths 0, 45, 90 and 135 degrees may be efficient as pixels come in from left to right and the processor 100 may compute the costs as the pixel data is received. The cost calculations for a next pixel may depend on previous cost calculations (e.g., the recurrence relation). For the raster scan order and the 0, 45, 90 and/or 135 degree paths, the previous cost calculations may be from pixels that are to the left of (or above) the current pixels. In an example, the cost calculations for the paths 160a-160d may be performed as the pixels are received in the pipeline 104 in the raster scan order. In another example, the cost calculations for the paths 160e-160g and/or the path 180 may comprise additional data storage and/or calculations because the previous cost calculations may not be available when pixels are received in the raster scan order (e.g., for the paths 160e-160g and/or the path 180, the recurrence relationship may be based on pixel data from below and/or the left of the current pixels).

Given the recurrence relation that defines each cost, the pipeline 104 may be configured to process the image 150 in a specified direction to calculate the values correctly and/or efficiently. A problem may arise when calculating the costs along the 180 degree path 180 (e.g., right-to-left) and/or the paths 160e-160g (e.g., bottom-to-top) and the pixels are presented in left-to-right order (e.g., the raster scan order). For computing the cost calculations for the path 180, the previous pixel cost may be based on pixels to the right of the current pixel 152. Without the previous pixel cost values computing the cost as the pixels are coming in may be inefficient. The buffers 120a-120n may be implemented to store the pixel (e.g., image) data. When the pipeline 104 has stored pixel data corresponding to one whole line of pixels of the image 150, the pipeline 104 may efficiently calculate the cost values for the path 180 (e.g., from right to left).

Figure 4:
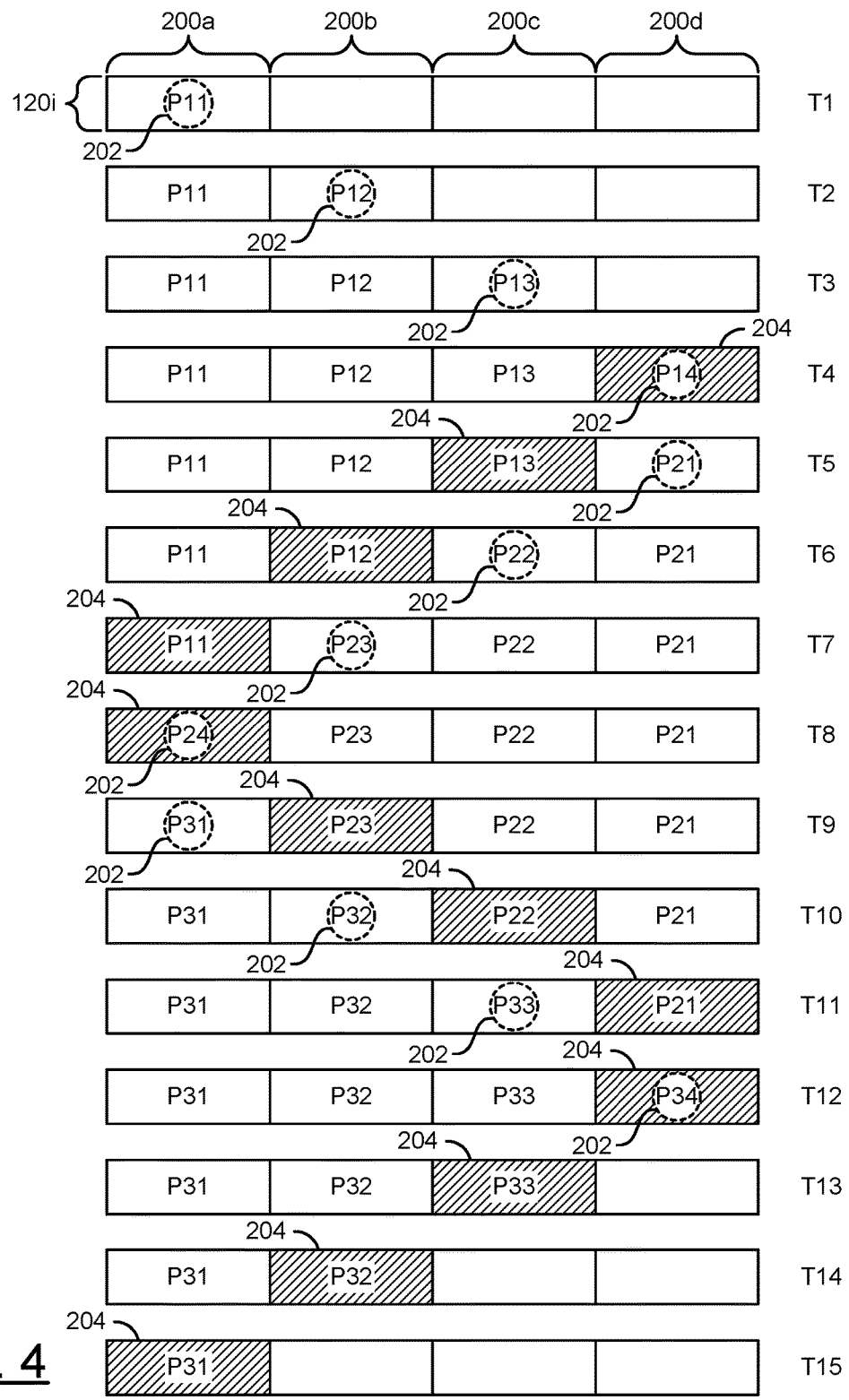
FIG. 4 is a diagram illustrating an example implementation of storing pixel data in a memory buffer.

Referring to FIG. 4, a diagram illustrating an example implementation of storing pixel data in the memory buffer 120a-120n is shown. The buffer 120i is shown receiving pixels in the raster scan order. The buffer 120i is shown at different times (or cycles) T1-T15. Each cycle T1-T15 may represent locations of pixel data (e.g., image data) at a particular time and/or stage of the pipeline 104. The buffer 120i may be a representative example of the reversible buffers 120a-120n.

The buffer 120i may comprise a number of blocks (or circuits) 200a-200n. The blocks 200a-200n may be configured as storage locations. In the example shown, the buffer 120i comprises four of the blocks 200a-200n (e.g., the storage location 200a, the storage location 200b, the storage location 200c and the storage location 200d). The storage locations 200a-200n may store image data corresponding to pixels of the image 150. In some embodiments, the width of the buffer 120i (e.g., the number of the storage locations 200a-200n) may be the same as the number of pixels (e.g., N pixels) in a row of the image 150. In some embodiments, the width of the buffer 120i may be larger than the number of pixels in a row of the image 150. The number of storage locations 200a-200n implemented by the buffer 120i may be varied according to the design criteria of a particular implementation.

The reversible buffer 120i may be implemented as a single-line buffer. Each of the storage locations 200a-200n may be configured to store the derived, per-pixel values corresponding to the pixels P11-PMN of the image 150 (e.g., image data). In some embodiments, each of the storage locations 200a-200n may have the same size (e.g., store the same number of bits). In some embodiments, each of the storage locations 200a-200n may have different sizes (e.g., store different numbers of bits). In one example, the size of the storage locations 200a-200n may correspond to 32 bits.

In another example, the size of the storage locations 200a-200n may correspond to 1024 bits. In yet another example, the storage locations 200a-200n may comprise memory sizes having a range of 32 bits to 1024 bits. The size of each of the storage locations 200a-200n may be varied according to the design criteria of a particular implementation.

In the example shown, the image 150 may comprise 3 rows and 4 columns of pixels (e.g., a 3×4 image). The first pixel in the raster scan order may be the pixel P11 and the last pixel in the raster scan order may be the pixel P34. In the example shown, the buffer 120i may have the same number of storage locations 200a-200d as the width of the image 150. Generally, the number of pixels of the image 150 and/or the width of the buffer may be significantly larger. Small numbers are used in the example shown for illustrative purposes.

In the example shown, the buffer 120i may receive (e.g., write) the data corresponding to the first line of pixels of the image 150 in order, from left to right. In some embodiments, the pipeline 104 may previously perform the cost calculations for one or more of the paths 160a-160d, prior to the pixel data being written to the storage locations 200a-200n of the buffer 120i. In some embodiments, the pipeline 104 may perform the cost calculations for one or more of the paths 160a-160d as the pixel data is being written to the storage locations 200a-200n of the buffer 120i. In some embodiments, the pipeline 104 may perform the cost calculations for one or more of the paths 160a-160d after the pixel data has been written to the storage locations 200a-200n of the buffer 120i. Generally, for calculating the paths 160a-160d, one entire row of pixel data may be stored, each time picking and replacing the appropriate pixel data from a row above (e.g., a previously calculated row).

In the first cycle T1, the buffer 120i may write the data corresponding to the pixel P11 in the storage location 200a. The pixel P11 may be last in pixel data 202. The remaining storage locations 200b-200d are shown as empty. In some embodiments, the storage locations 200b-200d may be storing previously written data that may be over-written (e.g., data from a previous image that is no longer needed).

In the cycle T2, the buffer 120i may write the data corresponding to the pixel P12 in the storage location 200b (e.g., the next available storage location moving from left to right). The pixel P12 may be the last in pixel data 202. In the cycle T3, the buffer 120i may write the data corresponding to the pixel P13 in the storage location 200c (e.g., the next available storage location moving from left to right). The pixel P13 may be the last in pixel data 202. The cycles T1-T3 may represent filling the buffer 120i with pixel data corresponding to a single line (or row) of pixels of the image 150 until the buffer 120i has received pixel data corresponding to every pixel of the line of the image 150. In the example shown, the image 150 may have four pixels per line. Similar steps as the cycles T1-T3 may be repeated (e.g., writing data in from left to right) for images having more pixels per line.

In the cycle T4, the buffer 120i may write the data corresponding to the pixel P14 in the storage location 200d (e.g., the next available storage location moving from left to right). The pixel P14 may be the last in pixel data 202. The pixel data P14 may correspond to the last pixel of the first row of the pixels of the image 150. In the example shown, the pixel data P14 corresponding to the last pixel of the first row of pixels of the image 150 may be stored in the last storage location 200d of the single line buffer 120i.

When the pixel data corresponding to an entire line of pixels of the image 150 is stored (e.g., the pixel data P11-P14), the pipeline 104 may begin to perform the cost calculations for the path 180 (e.g., the 180 degree path). The pixel data may be read from the buffer 120i in a last in, first out order. In the example shown, the buffer 120i may be read from right to left (e.g., from P14 towards P11). A read out location 204 is shown. The read out location 204 may correspond to the last in pixel data for one of the lines of pixels of the image 150. In the cycle T4, the read out location 204 may correspond to the storage location 200d. When the pixel P14 is read out from the read out location 204, the pipeline 104 may perform the cost calculation.

After reading out the pixel data from the read out location 204, the image data may be over-written with image data from a next line of the image 150. The pixel data stored in the read out location 204 may not be over-written until the cost calculation has been performed. Once the cost calculation has been performed on the pixel data P14, the recurrence relation for the cost calculations for the path 180 may be used to calculate the cost calculation for the path 180 of the previous pixel of the first row of the image 150 (e.g., the pixel P13).

After data corresponding to one entire row of pixels of the image 150 has been stored in the buffer 120i, the buffer 120i may reverse a direction for writing/storing data (e.g., change from left-to-right to right-to-left). In the cycle T5, the buffer 120i may write the data corresponding to the pixel P21 in the storage location 200d (e.g., the first available storage location moving from right to left). The storage location 200d may be available because the data corresponding to the pixel data P14 has already been read from the buffer 120i in the previous cycle T4. The pixel P21 may be the first pixel of the second row of the image 150 in the raster scan order. The data corresponding to the pixel P21 may over-write the pixel data for the pixel P14 in the storage location 200d. The pixel P21 may be the last in pixel data 202.

In the cycle T5, the buffer 120i may read out the data corresponding to the pixel P13 to enable the pipeline 104 to perform the cost calculation for the path 180. For example, the pipeline 104 may use the recurrence relation for the cost calculation of the path 180 for the pixel P13 based on the previously calculated cost of the path 180 based on the pixel P14. The storage location 200c may be the read out location 204. The buffer 120i may read out data from right-to-left for pixel data corresponding to the pixels P14-P11 as the buffer 120i writes image data in from right to left for the pixels corresponding to the second line of the image 150 (e.g., P21-P24).

In the cycle T6, the buffer 120i may write the data corresponding to the pixel P22 in the storage location 200c (e.g., the next available storage location moving from right to left after the pixel P13 has been read out in the cycle T5). The data corresponding to the pixel P23 may over-write the pixel data for the pixel P13 in the storage location 200c. The pixel P22 may be the last in pixel data 202. The buffer 120i may read out the data corresponding to the pixel P12 in the storage location 200b. The storage location 200b may be the read out location 204 to enable the pipeline 104 to perform the cost calculation for the path 180. For example, the pipeline 104 may use the recurrence relation for the cost calculation of the path 180 for the pixel P12 based on the previously calculated costs of the path 180 based on the pixel P14 and the pixel P13.

In the cycle T7, the buffer 120i may write the data corresponding to the pixel P23 in the storage location 200b (e.g., the next available storage location moving from right to left after the pixel P12 has been read out in the cycle T6). The data corresponding to the pixel P23 may over-write the pixel data for the pixel P12 in the storage location 200b. The pixel P23 may be the last in pixel data 202. The buffer 120i may read out the data corresponding to the pixel P11 in the storage location 200a. The storage location 200a may be the read out location 204 to enable the pipeline 104 to perform the cost calculation for the path 180. For example, the pipeline 104 may use the recurrence relation for the cost calculation of the path 180 for the pixel P11 based on the previously calculated costs of the path 180 based on the pixel P14, the pixel P13 and the pixel P12.

After the data corresponding to the pixel P11 has been read out of the buffer 120i in the cycle T7, data corresponding to the entire first row of pixels of the image 150 may have been read out (and had the cost calculation for the path 180 performed). After the cycle T7, the data buffer 120i may reverse a direction for reading out data corresponding to the pixels of the image 150 from right-to-left to left-to-right. For example, for the second row of pixels P21-P24, the buffer 120i may read out the storage locations 200a-200d from left to right. Reading out the storage locations 200a-200d for the pixel data corresponding to the second line of pixels of the image 150 may enable the pixel data to be read out in a last in, first out sequence.

In the cycle T8, the buffer 120i may write the data corresponding to the pixel P24 in the storage location 200a (e.g., the next available storage location moving from right to left after the pixel P11 has been read out in the cycle T7). The data corresponding to the pixel P24 may over-write the pixel data for the pixel P11 in the storage location 200a. The pixel P24 may be the last in pixel data 202. Writing the data corresponding to the pixel P24 into the buffer 120i may provide all the pixel data corresponding to the second line of pixels of the image 150 to the buffer 120i. With all of the pixel data corresponding to the second line of pixels of the image 150, the data buffer 120i may start to read out the pixel data for the cost calculations of the path 180 for the pixels P24-P21.

In the cycle T8, the buffer 120i may read out the data corresponding to the pixel P24 in the storage location 200a. The storage location 200a may be the read out location 204 to enable the pipeline 104 to perform the cost calculation for the path 180. The cost calculation for the path 180 of the pixel P24 may provide a recurrence relation for the rest of the pixels of the same line (e.g., P23-P21).

After each of the pixels P21-P24 have been written to the buffer 120i and the pipeline 104 has begun to perform the cost calculations for the path 180 for the pixels P21-P24, the data buffer 120i may initiate storing the pixel data corresponding to the pixels P31-P34 of the third line of the image 150. The buffer 120i may reverse the direction of writing the pixel data for the third row of the image 150. In the example shown, the data buffer 120i may change the direction of storing the pixel data from right-to-left for the second row of pixels to left-to-right for the third row of pixels of the image 150.

In the cycle T9, the buffer 120i may write the data corresponding to the pixel P31 in the storage location 200a (e.g., the first available storage location moving from left to right). The storage location 200a may be available because the data corresponding to the pixel data P24 has already been read from the buffer 120i in the previous cycle T8. The pixel P31 may be the first pixel of the third row of the image 150. The data corresponding to the pixel P31 may over-write the pixel data for the pixel P24 in the storage location 200a. The pixel P31 may be the last in pixel data 202. The buffer 120i may read out the data corresponding to the pixel P23 in the storage location 200b. The storage location 200b may be the read out location 204 to enable the pipeline 104 to perform the cost calculation for the path 180. For example, the pipeline 104 may use the recurrence relation for the cost calculation of the path 180 for the pixel P23 based on the previously calculated costs of the path 180 based on the pixel P24.

The cycle T10 and the cycle T11 may similarly write pixels P32 and P33 to the storage location 200b and the storage location 200c, respectively (e.g., left-to-right). The cycle T10 and the cycle T11 may similarly read out pixels P22 and P21 from the storage location 200c and the storage location 200d, respectively (e.g., left-to-right). After the cost calculation for the pixel data corresponding to the pixel P21 has been performed, the pipeline 104 may have completed the cost calculations for the path 180 for each of the pixels corresponding to the second line of the image 150. After the cost calculations for the path 180 for each of the pixels corresponding to the second line of the image 150 have been performed, the buffer 120i may reverse the direction for reading out the pixels for the next (e.g., third) line of the image 150. For example, the direction for reading out the pixel data may change from left-to-right for the pixel data corresponding to the second row of pixels of the image 150 to right-to-left for the pixel data corresponding to the third row of pixels of the image 150.

In the cycle T12, the buffer 120i may write the data corresponding to the pixel P34 in the storage location 200d (e.g., the next available storage location moving from left to right after the pixel P21 has been read out in the cycle T11). The data corresponding to the pixel P34 may over-write the pixel data for the pixel P21 in the storage location 200d. The pixel P34 may be the last in pixel data 202. Writing the data corresponding to the pixel P34 into the buffer 120i may provide all the pixel data corresponding to the third line of pixels of the image 150 to the buffer 120i. With all of the pixel data corresponding to the third line of pixels of the image 150 stored, the data buffer 120i may start to read out the pixel data for the cost calculations of the path 180 for the pixels P34-P31. In the example shown, the third line of pixels of the image 150 may be the last line. No more pixels may be presented to be written into the data buffer 120i in the raster scan order for the image 150.

In the cycle T12, the buffer 120i may read out the data corresponding to the pixel P34 in the storage location 200d. The storage location 200d may be the read out location 204 to enable the pipeline 104 to perform the cost calculation for the path 180. The cost calculation for the path 180 of the pixel P34 may provide a recurrence relation for the rest of the pixels of the same line (e.g., P33-P31).

In the cycle T13, the buffer 120i may read out the data corresponding to the pixel P33 in the storage location 200c. In the cycle T14, the buffer 120i may read out the data corresponding to the pixel P32 in the storage location 200b. In the cycle T15, the buffer 120i may read out the data corresponding to the pixel P31 in the storage location 200a. The cycles T12-T15 may read out the pixel data corresponding to the third line of the image 150 from right-to-left to enable the pipeline 104 to perform the cost calculations for each pixel P34-P31 for the path 180.

In the cycles T13-T15, the data buffer 120i may purge the data corresponding to the pixels P34-P31 after the data has been read out. In some embodiments, the pixel data corresponding to the pixel data P34-P31 may be left in the storage locations 200a-200d until new data is provided. Data for a next image (or video frame) may be provided to the data buffer 120i to over-write the pixel data corresponding to the pixels P34-P31 in the storage locations 200a-200d. In one example, a pixel P11 corresponding to a first pixel in a raster scan order of a next image of the stereo pair (e.g., the image FRAME2) may be written to the storage location 200d in the cycle T13.

After the cost calculation has been performed for data corresponding to the pixel P31, the cost calculation for the path 180 may have been performed for each pixel of the image 150. The pipeline 104 may use the data from the cost calculations to generate the signal DEPTH.

The buffers 120a-120n may be configured to reverse the direction for storing and/or reading image data for each line of the image 150 (e.g., reverse directions from one line of pixels to the next line of pixels). In the example shown, the data buffer 120i may be configured to write pixel data corresponding to a first line of pixels of the image 150 from left to right and, after all the pixel data for the line has been written, then read the first line of pixels from right to left. The data buffer 120i may write pixel data corresponding to a second line of pixels of the image 150 from right to left and, after all the pixel data for the second line has been written, then read the second line of pixels from left to right. For each line of pixels of the image 150, the data buffer 120i may read and write operations in opposite directions for the same line and then alternate directions for the next line. For example, the location for the next read and/or write operation to/from the buffer 120i may snake (e.g., reverse) back and forth. Generally, for even rows of the image 150 (e.g., row 0, row 2, row 4, etc.) the pixel data may be written to the buffer 120i from address 0 (e.g., the storage location 200a) to address n (e.g., the storage location 200n) and read from address n to address 0 and for odd rows of the image 150 (e.g., row 1, row 3, row 5, etc.) the pixel data may be written to the buffer 120i from address n to address 0 and read from address 0 to address n.

Implementing the reversible buffers 120a-120n may save an amount of area needed for storage. For example, an implementation that uses a two line buffer (e.g., one line for storing a first line, and a second line to store the next line while the data is read from the first line) uses twice as many storage locations. The fact that the pixel data comprises derived values that are much larger than basic (e.g., eight bit) pixels may make cost savings from the reversing buffer 120i significant. Implementing the reversible buffers 120a-120n may reduce a number of hardware components implemented and/or a cost of implementing the pipeline 104.

Figure 5:
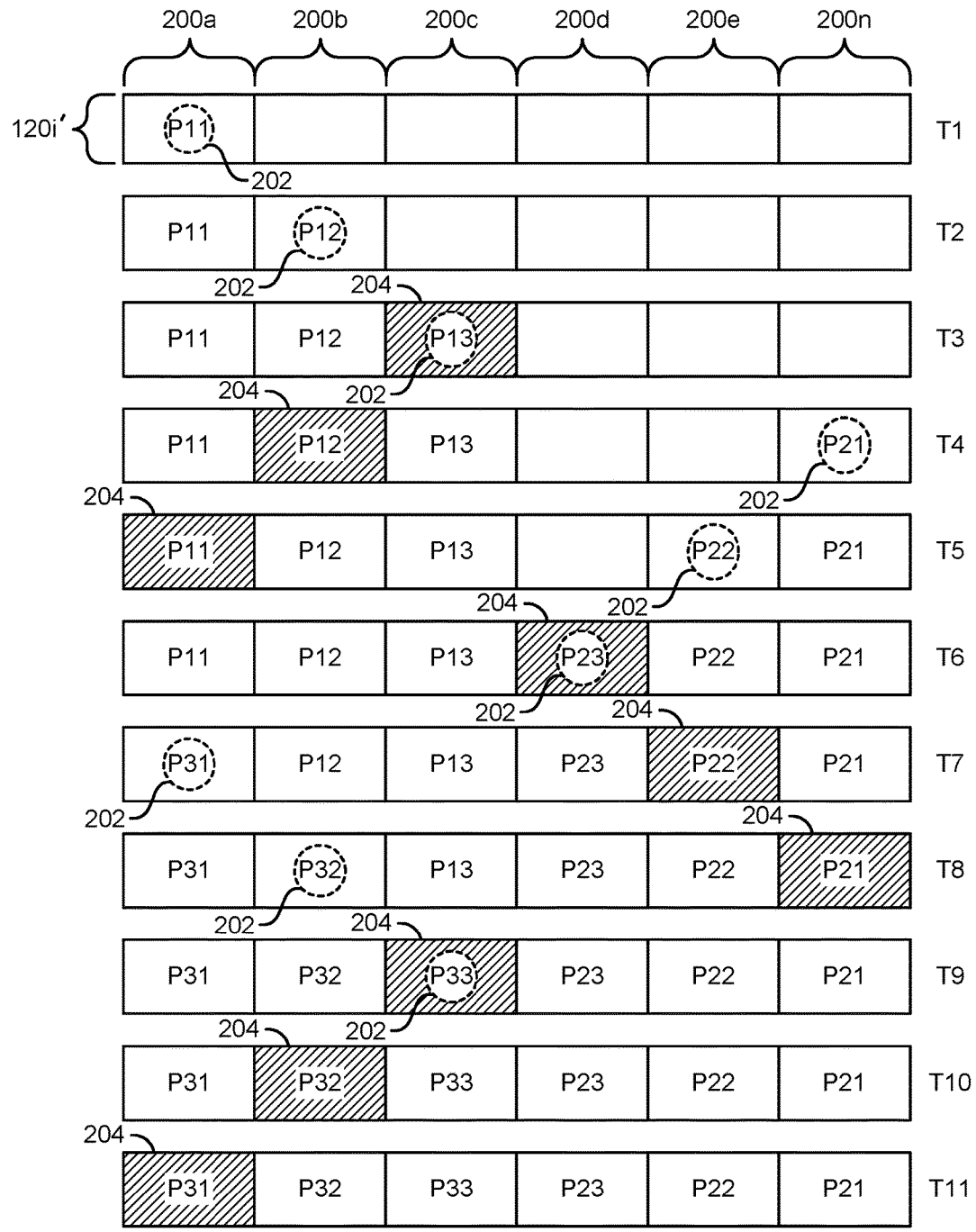
FIG. 5 is a diagram illustrating an example implementation of storing pixel data in a memory buffer when the memory buffer is wider than the number of pixels in a line of the image.

Referring to FIG. 5, a diagram illustrating an example implementation of storing pixel data in the memory buffer 120i' when the memory buffer is wider than the number of pixels in a line of the image 150 is shown. The buffer 120i' is shown receiving image data in the raster scan order. The buffer 120i' is shown at different times (or cycles) T1-T11. Each cycle T1-T11 may represent locations of pixel data at a particular time and/or stage of the pipeline 104. The buffer 120i' may be a representative example of the reversible buffers 120a-120n.

In the example shown, the buffer 120i' comprises six of the blocks 200a-200n (e.g., from left-to-right the storage location 200a, the storage location 200b, the storage location 200c, the storage location 200d, the storage location 200e and the storage location 200n). In the example shown, the image 150 may comprise 3 rows and 3 columns of pixels (e.g., a 3×3 image). The first pixel in the raster scan order may be the pixel P11 and the last pixel in the raster scan order may be the pixel P33.

In the example shown, the buffer 120i' may have a larger number of storage locations 200a-200n than the width of the image 150. When the image line width (e.g., n) is less than the buffer line width (e.g., N) then the next line may start at the storage location at the end (or beginning) of the buffer line width rather than at the storage location that corresponds with the actual line width of the image (e.g., n). Moving to the end (or beginning) of the buffer 120i' for the next line of the image may result in wasting some buffer space, but the implementation may be easier (e.g., reduce complexity of the associated circuitry).

In the first cycle T1, the buffer 120i' may write the data corresponding to the pixel P11 in the storage location 200a. The pixel P11 may be the first pixel of the first line of the image 150 (e.g., the first pixel presented in the raster scan order). The pixel P11 may be the last in pixel data 202. The buffer 120i' may write the data corresponding to the pixels corresponding to the first row of pixels of the image 150 in a left-to-right order (e.g., similar to the description provided in association with FIG. 4). The buffer 120i' may write the data corresponding to the pixel P12 in the storage location 200b in the cycle T2. The buffer 120i' may write the data corresponding to the pixel P13 in the storage location 200c in the cycle T3. The pixel data P13 may be the last in pixel data 202.

In the cycle T3, the buffer 120i' may have pixel data from each of the pixels of the first line of the image 150. The buffer 120i' may begin reading out the pixel data P13-P11 corresponding to the first line from right-to-left (e.g., last in, first out) to enable the pipeline 104 to perform the cost calculations for the path 180. In the cycle T3, the storage location 200c may be the read out location 204. The pixel data P13 may be read from the buffer 120i'.

In the cycle T4, the buffer 120i' may read out the pixel data P12. The storage location 200b may be the read out location 204. The pipeline 104 may use the recurrence relation to perform the cost calculation for the path 180 for the pixel P12 based on the previously calculated cost for the pixel P13.

The buffer 120i' may write the pixel data P21 to the storage location 200n. The pixel data P21 may correspond to the first pixel of the second line of the image 150. In an example, the pixel data P21 may be written to the last location (e.g., the location at the end) of the buffer 120i'. The pixel data corresponding to the second row of pixels of the image 150 may be written to the data buffer 120i' in a right-to-left direction starting from the rightmost storage location 200n (e.g., a reverse direction compared to the direction for writing the first line of pixels). For example, the storage location 200n may be the first storage location in the right-to-left direction (e.g., the first location used for receiving the pixel data for the second row in the raster scan order).

In the cycle T5, the read out location 204 may correspond to the storage location 200a. The data buffer 120i' may read out the pixel data P11. After the pixel data P11 has been read out of the buffer 120i', each of the pixels corresponding to the first row of pixels of the image 150 may be used by the pipeline 104 to determine the cost calculation for the path 180. The data buffer 120i' may write the pixel data P22 in the storage location 200e.

In the cycle T6, the data buffer 120i' may write the pixel data P23 in the storage location 200d. The pixel data P23 may be the last in pixel data 202. When the pixel data P23 is stored, the data buffer 120i' may have pixel data corresponding to each of the pixels of the second line of the image 150 stored. In the cycle T6, the data buffer 120i' may begin reading out the pixel data P23-P21 corresponding to the second line of the image 150. The data buffer 120i' may read out the data for the second line of the image in a left-to-right order. For example, the data buffer 120i' may change (e.g., reverse) directions for reading out the image data. The data buffer 120i' may change the read out location from the storage location 200a to the storage location (e.g., 200d) corresponding with the last pixel of the second line of the image 150. In the cycle T6, the data buffer 120i' may read out the pixel data P23.

In the cycle T7, the data buffer 120i' may read out the pixel data P22. The storage location 200e may be the read out location 204. The pipeline 104 may use the recurrence relation to perform the cost calculation for the path 180 for the pixel P22 based on the previously calculated cost for the pixel P23.

The buffer 120i' may write the pixel data P31 to the storage location 200a. The pixel data P31 may correspond to the first pixel of the third (e.g., last) line of the image 150. In an example, the pixel data P31 may be written to the first location (e.g., the location at the beginning) of the buffer 120i'. The pixel data corresponding to the third row of pixels of the image 150 may be written to the data buffer 120i' in a left-to-right direction starting from the leftmost storage location 200a. For example, the storage location 200a may be the first storage location in the left-to-right direction (e.g., the first location used for receiving the pixel data for the third row in the raster scan order).

In the cycle T8, the read out location 204 may correspond to the storage location 200n. The data buffer 120i' may read out the pixel data P21. After the pixel data P21 has been read out of the buffer 120i', each of the pixels corresponding to the second row of pixels of the image 150 may be used by the pipeline 104 to determine the cost calculation for the path 180. After, each of the pixels corresponding to the second row of pixels of the image 150 has been read out, the buffer 120i' may reverse the direction for reading out the pixel data for the next row of pixels of the image 150. The data buffer 120i' may write the pixel data P32 in the storage location 200b.

In the cycle T9, the data buffer 120i' may write the pixel data P33 in the storage location 200c. The pixel data P33 may be the last in pixel data 202. When the pixel data P33 is stored, the data buffer 120i' may have pixel data corresponding to each of the pixels of the third (e.g., last) line of the image 150 stored.

In the cycle T9, the data buffer 120i' may begin reading out the pixel data P33-P31 corresponding to the third line of the image 150. The data buffer 120i' may read out the data for the third line of the image in a right-to-left order. For example, the data buffer 120i' may change directions for reading out the pixel data. The data buffer 120i' may change the read out location from the storage location (e.g., 200c) corresponding to the last pixel of the third line of the image 150 to the storage location 200a (e.g., the leftmost storage location). In the cycle T9, the data buffer 120i' may read out the pixel data P33.

In the cycle T10, the buffer 120i' may read out the pixel data P32 from the storage location 200b. In the cycle T11, the buffer 120i' may read out the pixel data P31 from the storage location 200a. After reading out the pixel data P31 in the cycle T11, the pipeline may have the pixel data and/or the recurrence relation information for performing the cost calculation for the path 180 for each pixel of the image 150.

Since each of the pixels of the image 150 have already been presented to the buffer 120i', the buffer 120i' may not need to write in new pixel data in the cycles T10-T11. In some embodiments, the buffer 120i' may purge unneeded data from the storage locations 200a-200n (e.g., the pixel data P21-P23 in the cycles T9-T11). In some embodiments, the buffer 120i' may retain the stored data until new data is provided to over-write the unneeded stored data.

When the length of the buffer 120i' is larger than the width of the image 150, writing the image data for each row of the image 150 starting from the ends of the buffer 120i' may be easier to implement. For example, the digital logic and/or instructions from the firmware 130 to track the pixel data corresponding to the start and/or end of a row of pixels may have a lower complexity. Writing the pixel data for each row of the image 150 starting from the ends of the buffer 120i' may not utilize all the storage locations 200a-200n. In the example shown (e.g., when the buffer 120i' is twice the width of the row of pixels of the image 150), each of the storage locations may be used. However, if the buffer 120i' is wider than twice the width of the image 150, some of the storage locations in the buffer 120i' may not be used. For example, if the width of the image is 3 pixels and the buffer 120i' implements seven storage locations (e.g., 120a-120g), the storage locations 120a-120c and the storage locations 120e-120g may be used (e.g., the 3 leftmost storage locations and the 3 rightmost storage locations) but the storage location 200d may not be used (e.g., the fourth storage location from either side will not be reached when the image is three pixels wide).

Figure 6:
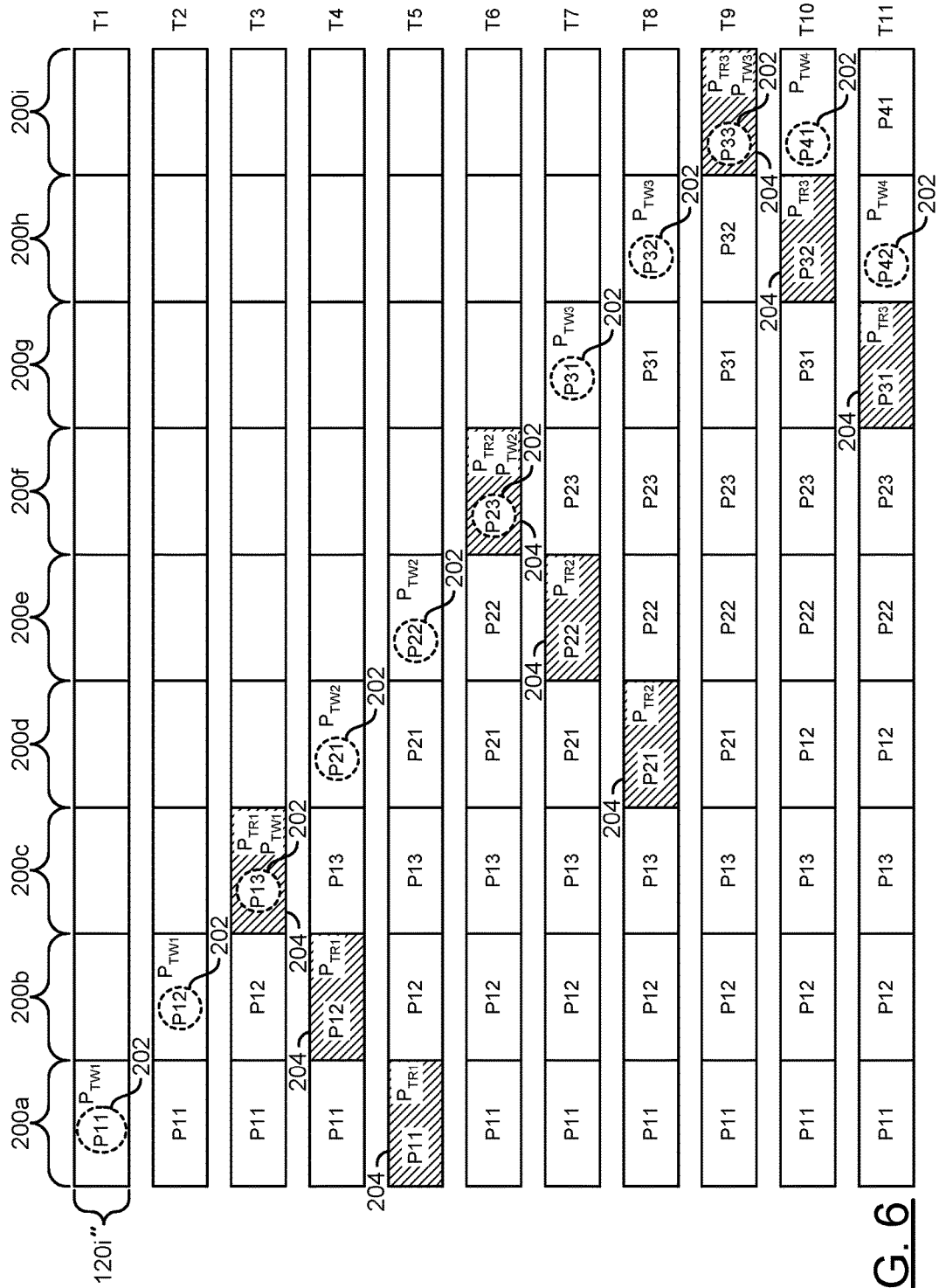
FIG. 6 is a diagram illustrating an example implementation of storing pixel data in a memory buffer using pointers.

Referring to FIG. 6, a diagram illustrating an example implementation of storing pixel data in the memory buffer 120i''' using pointers is shown. The buffer 120i''' is shown receiving image data in the raster scan order. The buffer 120i''' is shown at different times (or cycles) T1-T11. Each cycle T1-T11 may represent locations of pixel data at a particular time and/or stage of the pipeline 104. The buffer 120i''' may be a representative example of the reversible buffers 120a-120n.

In the example shown, the buffer 120i''' comprises nine of the blocks 200a-200n (e.g., from left-to-right the storage location 200a, the storage location 200b, the storage location 200c, the storage location 200d, the storage location 200e, the storage location 200f, the storage location 200g, the storage location 200h and the storage location 200i). In the example shown, the image 150 may comprise rows having 3 columns of pixels (e.g., an Mx3 image). The first pixel in the raster scan order may be the pixel P11 and the last pixel in the raster scan order may be the pixel PM3. The cycles T1-T11 may represent a portion of the rows of the image 150 progressing through the buffer 120i''' (e.g., additional cycles may be implemented for the rest of the pixel data of the image 150).

In some embodiments, the processor 100 and/or the firmware 130 may be configured to keep track of exactly where each line of pixels of the image 150 starts and/or ends using write pointers and/or read pointers. Using write pointers and/or read pointers may enable each storage location 200a-200i of each of the buffers 120a-120n to be utilized to accept more input lines of pixel data of the image 150 before back pressure occurs on the input when the input is small. Additional control logic may be implemented for the buffers 120a-120n for keeping track of the read pointers and/or write pointers (e.g., increase complexity of the associated circuitry).

In the example shown, the buffer 120i''' may have a larger number of storage locations 200a-200i than the width of the image 150 (e.g., the buffer 120i''' may be wider than the image 150). Generally, read pointers and/or write pointers may be useful when the lines of pixel data of the image 150 are small enough compared to the width of the buffer 120i'''. In an example, the lines of pixel data of the image 150 may be small enough when the buffer 120i''' has enough of the storage locations 200a-200i to store more than two complete lines of pixel data. In the example described in association with FIG. 5, two lines of pixel data of the image 150 may be stored before back pressure occurs (e.g., previously stored pixel data is overwritten by newly written pixel data). Using the pointers may enable more lines of pixel data to be stored without back pressure. In the example shown, three complete lines of the image 150 may be stored in the buffer 120i‴.

The read pointers and/or write pointers may be implemented and/or tracked using the processor 100 and/or the firmware 130. For each line of pixel data of the image 150, one write pointer (e.g., PTW1, PTW2, PTW3, . . . , PTWM, for M lines) and one read pointer (e.g., PTR1, PTR2, PTR3, . . . , PTRM, for M lines) may be implemented. The read pointers PTR1-PTRM and/or the write pointers PTW1-PTWM may be implemented to ensure pixel data stored in the buffer 120i‴ may not be overwritten until the pixel data is read out (e.g., the cost calculations are performed). In one example, if the data buffer 120i‴ is configured to store 3 lines of pixel data then three read pointers (e.g., PTR1, PTR2 and PTR3) and three write pointers (e.g., PTW1, PTW2 and PTW3) may be implemented. In another example, the number of read pointers and/or write pointers may be restricted to 8. The number of read pointers PTR1-PTRM and/or write pointers PTW1-PTWM may be varied according to the design criteria of a particular implementation.

In the first cycle T1, the buffer 120i‴ may write the data corresponding to the pixel P11 in the storage location 200a. The pixel P11 may be the first pixel (e.g., left-most pixel) of the first line (e.g., top line) of the image 150 (e.g., the first pixel presented in the raster scan order). The pixel P11 may be the last in pixel data 202. The buffer 120i‴ may write the data corresponding to the pixels corresponding to the first row of pixels of the image 150 in a left-to-right order (e.g., similar to the description provided in association with FIG. 4). To track the location of the newly written data and/or which line the newly written data corresponds to, the write pointer PTW1 (e.g., for the first line of the image 150) may point to the storage location 200a.

The buffer 120i‴ may write the data corresponding to the pixel P12 in the storage location 200b in the cycle T2. The pixel data P12 may be the last in pixel data 202. The write pointer PTW1 may be moved to point to the storage location 200b. The buffer 120i‴ may write the data corresponding to the pixel P13 in the storage location 200c in the cycle T3. The write pointer PTW1 may be moved to point to the storage location 200c. The pixel data P13 may be the last in pixel data 202.

In the cycle T3, the buffer 120i‴ may have pixel data from each of the pixels of the first line of the image 150. The buffer 120i‴ may begin reading out the pixel data P13-P11 corresponding to the first line from right-to-left (e.g., last in, first out) to enable the pipeline 104 to perform the cost calculations for the path 180. In the cycle T3, the storage location 200c may be the read out location 204. The pixel data P13 may be read from the buffer 120i‴. To track the read out location for the first line of pixel data corresponding to the image 150, the read pointer PTR1 may point to the storage location 200c. In the cycle T3, the read pointer PTR1 and the write pointer PTW1 may both point to the storage location 200c.

In the cycle T4, the buffer 120i‴ may read out the pixel data P12. The storage location 200b may be the read out location 204. To track the read out location 204 for the first line of pixel data corresponding to the image 150, the read pointer PTR1 may be moved to point to the storage location 200b. The pipeline 104 may use the recurrence relation to perform the cost calculation for the path 180 for the pixel P12 based on the previously calculated cost for the pixel P13.

The buffer 120i‴ may write the pixel data P21 to the storage location 200d. The pixel data P21 may be the last in pixel data 202. The pixel data P21 may correspond to the first pixel of the second line of the image 150. Since all of the pixel data corresponding to the first line of pixels of the image 150 has been written, the write pointer PTW1 may not be needed after the cycle T3. To track the location of the newly written data and/or which line the newly written data corresponds to, the write pointer PTW2 (e.g., for the second line of the image 150) may point to the storage location 200d. The pixel data corresponding to the second row of pixels of the image 150 may be written to the data buffer 120i‴ in a left-to-right direction starting from the next available location 200d (e.g., in a same direction as the direction for writing the first line of pixels, unless the end of the buffer 120i‴ has been reached).

In the cycle T5, the read out location 204 may correspond to the storage location 200a. The data buffer 120i‴ may read out the pixel data P11. To track the read out location for the first line of pixel data corresponding to the image 150, the read pointer PTR1 may be moved to point to the storage location 200a. After the pixel data P11 has been read out of the buffer 120i‴, each of the pixels corresponding to the first row of pixels of the image 150 may be used by the pipeline 104 to determine the cost calculation for the path 180. Since all of the pixel data corresponding to the first line of pixels of the image 150 has been read out, the read pointer PTR1 may not be needed after the cycle T5. The data buffer 120i‴ may write the pixel data P22 in the storage location 200e. The pixel data P22 may be the last in pixel data 202. The write pointer PTW2 may be moved to point to the storage location 200e.

The buffer 120i‴ may write the data corresponding to the pixel P23 in the storage location 200f in the cycle T6. The write pointer PTW2 may be moved to point to the storage location 200f. The pixel data P23 may be the last in pixel data 202. In the cycle T6, the buffer 120i‴ may have pixel data from each of the pixels of the second line of the image 150. The buffer 120i‴ may begin reading out the pixel data P23-P21 for the second line from right-to-left (e.g., last in, first out) to enable the pipeline 104 to perform the cost calculations for the path 180. In the cycle T6, the storage location 200f may be the read out location 204. The pixel data P23 may be read from the buffer 120i‴. To track the read out location for the second line of pixel data corresponding to the image 150, the read pointer PTR2 may point to the storage location 200f. In the cycle T6, the read pointer PTR2 and the write pointer PTW2 may both point to the storage location 200f.

In the cycle T7, the buffer 120i‴ may read out the pixel data P22. The storage location 200e may be the read out location 204. To track the read out location for the second line of pixel data corresponding to the image 150, the read pointer PTR2 may be moved to point to the storage location 200e. The pipeline 104 may use the recurrence relation to perform the cost calculation for the path 180 for the pixel P22 based on the previously calculated cost for the pixel P23.

The buffer 120i‴ may write the pixel data P31 to the storage location 200g. The pixel data P31 may be the last in pixel data 202. The pixel data P31 may correspond to the first pixel of the third line of the image 150. Since all of the pixel data corresponding to the second line of pixels of the image 150 has been written, the write pointer PTW2 may not be needed after the cycle T6. To track the location of the newly written data and/or which line the newly written data corresponds to, the write pointer PTW3 (e.g., for the third line of the image 150) may point to the storage location 200g. The pixel data corresponding to the third row of pixels of the image 150 may be written to the data buffer 120i''' in a left-to-right direction starting from the next available location 200g (e.g., in a same direction as the direction for writing the second line of pixels, unless the end of the buffer 120i''' has been reached).

In the cycle T8 the read out location 204 may correspond to the storage location 200d. The data buffer 120i''' may read out the pixel data P21. To track the read out location for the second line of pixel data corresponding to the image 150, the read pointer PTR2 may be moved to point to the storage location 200d. After the pixel data P21 has been read out of the buffer 120i''', each of the pixels corresponding to the second row of pixels of the image 150 may be used by the pipeline 104 to determine the cost calculation for the path 180. Since all of the pixel data corresponding to the second line of pixels of the image 150 has been read out, the read pointer PTR2 may not be needed after the cycle T8. The data buffer 120i''' may write the pixel data P32 in the storage location 200h.

The write pointer PTW3 may be moved to point to the storage location 200h.

The buffer 120i''' may write the data corresponding to the pixel P33 in the storage location 200i in the cycle T9. The write pointer PTW3 may be moved to point to the storage location 200i. The pixel data P33 may be the last in pixel data 202. In the cycle T9, the buffer 120i''' may have pixel data from each of the pixels of the third line of the image 150. The buffer 120i''' may begin reading out the pixel data P33-P31 for the third line from right-to-left (e.g., last in, first out) to enable the pipeline 104 to perform the cost calculations for the path 180. In the cycle T9, the storage location 200i may be the read out location 204. The pixel data P33 may be read from the buffer 120i'''. To track the read out location for the second line of pixel data corresponding to the image 150, the read pointer PTR3 may point to the storage location 200i. In the cycle T9, the read pointer PTR3 and the write pointer PTW3 may both point to the storage location 200i.

In the cycle T10, the buffer 120i''' may read out the pixel data P32. The storage location 200h may be the read out location 204. To track the read out location for the third line of pixel data corresponding to the image 150, the read pointer PTR3 may be moved to point to the storage location 200h. The pipeline 104 may use the recurrence relation to perform the cost calculation for the path 180 for the pixel P32 based on the previously calculated cost for the pixel P33.

The buffer 120i''' may write the pixel data P41 to the storage location 200i. The pixel data P41 may be the last in pixel data 202. The pixel data P41 may correspond to the first pixel of the fourth line of the image 150. Since all of the pixel data corresponding to the third line of pixels of the image 150 has been written, the write pointer PTW3 may not be needed after the cycle T9. To track the location of the newly written data and/or which line the newly written data corresponds to, the write pointer PTW4 (e.g., for the fourth line of the image 150) may point to the storage location 200i. The pixel data corresponding to the fourth row of pixels of the image 150 may be written to the data buffer 120i''' in a right-to-left direction starting from the next available location 200i. Since the end of the buffer 200i has been reached and the pixel data in the storage location 200i corresponding to the pixel data P33 had been read out in the cycle T9, the direction for writing new data in the buffer 120i''' may be reversed (e.g., a direction opposite to the direction for writing the third line of pixels, since the end of the buffer 120i''' has been reached).

In the cycle T11 the read out location 204 may correspond to the storage location 200g. The data buffer 120i''' may read out the pixel data P31. To track the read out location for the third line of pixel data corresponding to the image 150, the read pointer PTR3 may be moved to point to the storage location 200g. After the pixel data P31 has been read out of the buffer 120i''', each of the pixels corresponding to the third row of pixels of the image 150 may be used by the pipeline 104 to determine the cost calculation for the path 180. Since all of the pixel data corresponding to the third line of pixels of the image 150 has been read out, the read pointer PTR3 may not be needed after the cycle T11. The data buffer 120i''' may write the pixel data P42 in the storage location 200h. The pixel data P42 may be the last in pixel data 202. The write pointer PTW4 may be moved to point to the storage location 200h.

The pixel data corresponding to the image 150 may continue to be written to the data buffer 120i''' until all the pixel data has been written in and read out. The directions for storing and reading the pixel data may reverse direction when the ends of the buffer 120i''' are reached. For example, in the next cycle, the pixel data P43 may be written into the storage location 200g to completely store the fourth line of pixel data of the image 150 and the data buffer 120i''' may begin reading out the pixel data P43-P41 in a left-to-right order (e.g., last in, first out order). The directions of writing in pixel data and/or reading out pixel data may be reversed each time the read pointer and the write pointer both point to one of the ends of the data buffer 120i'''. For example, in the cycle T9, the read pointer PTR3 and the write pointer PTW3 both point to the end storage location 200i and the direction for writing new pixel data changes direction in the cycle T10 and the direction for reading out pixel data changes may change direction in the cycle T12 (e.g., after the entire line has been read out).

Figure 7:
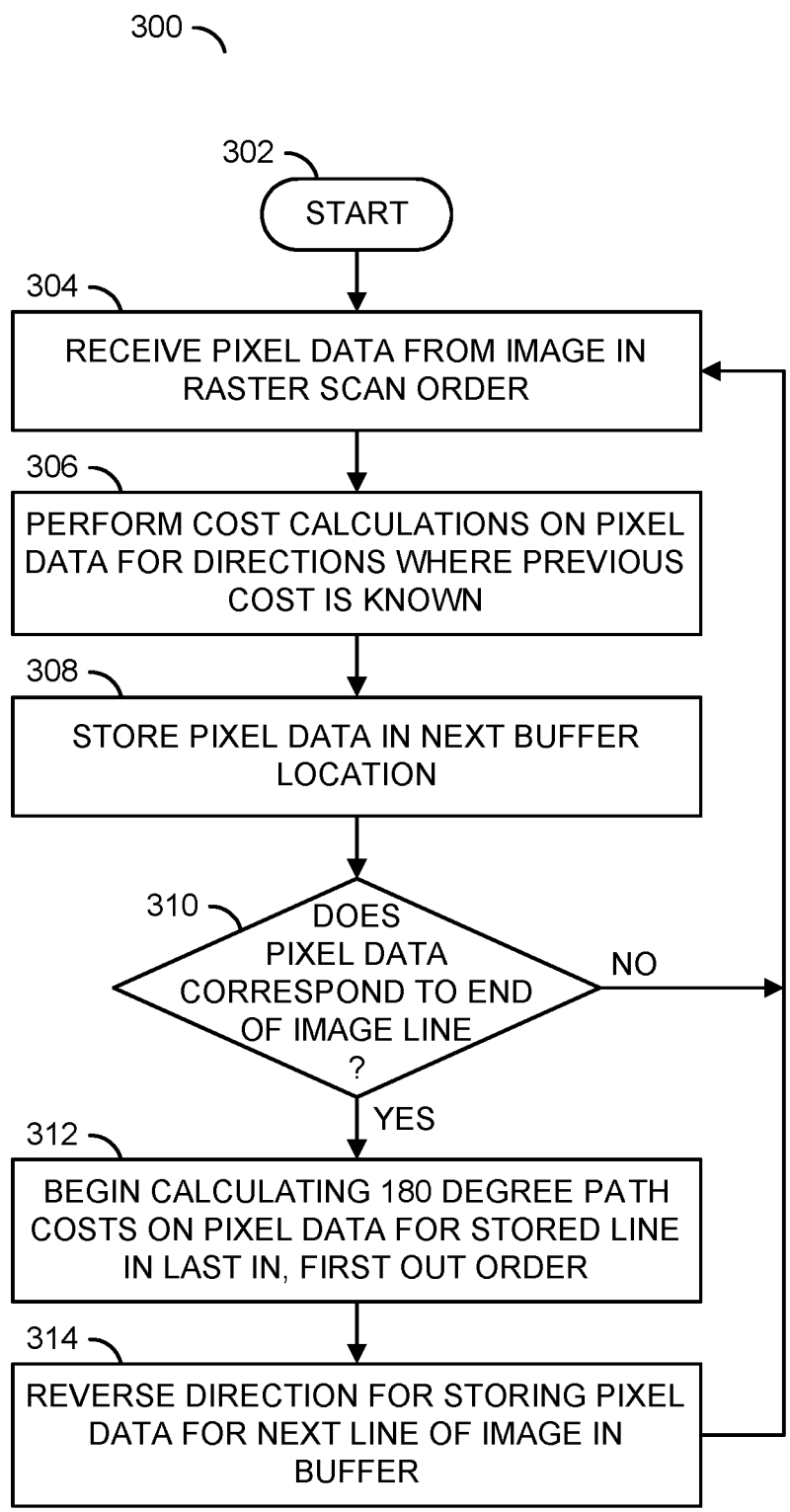
FIG. 7 is a flow diagram illustrating a method for performing stereo reconstruction using an efficient memory buffer.

Referring to FIG. 7, a method (or process) 300 is shown. The method 300 may perform stereo reconstruction using the efficient memory buffers 120a-120n. The method 300 generally comprises a step (or state) 302, a step (or state) 304, a step (or state) 306, a step (or state) 308, a decision step (or state) 310, a step (or state) 312, and a step (or state) 314.

The state 302 may start the method 300. In the state 304, the pipeline 104 may receive the pixel data P11-PMN from the image 150 in the raster scan order. For example, the pixels may be captured by the sensors 70a-70b, the interface 102 may transmit the pixels to the pipeline 104 and the components 110a-110n of the pipeline 104 may determine the pixel data P11-PMN. Next, in the state 306, the components 110a-110n of the pipeline 104 may perform the cost calculations on the pixel data P11-PMN for directions where the previous cost is known (e.g., the paths 160a-160d). In the state 308, the data buffers 120a-120n may store the pixel data P11-PMN in the next storage location 200a-200n of the data buffers 120a-120n. Next, the method 300 may move to the decision state 310.

In the decision state 310, the processor 100 and/or the firmware 130 may determine whether the pixel data corresponds to an end of the line of the image 150 (e.g., determine whether an entire line of pixel data has been written to the data buffers 120a-120n). If the pixel data does not correspond to the end of the line of the image 150, the method 300 may return to the state 304. If the pixel data does correspond to the end of the line of the image 150, the method 300 may move to the state 312. In the state 312, the components 110a-110n of the pipeline 104 may begin calculating the 180 degree cost calculations for the path 180 (e.g., the pixel data for the line stored in the buffers 120a-120n may be read out in a last in, first out order). Next, in the state 314, the storage direction for storing the pixel data P11-PMN in the data buffers 120a-120n corresponding to the next line of the image 150 may be reversed. Next, the method 300 may return to the state 304.

Figure 8:
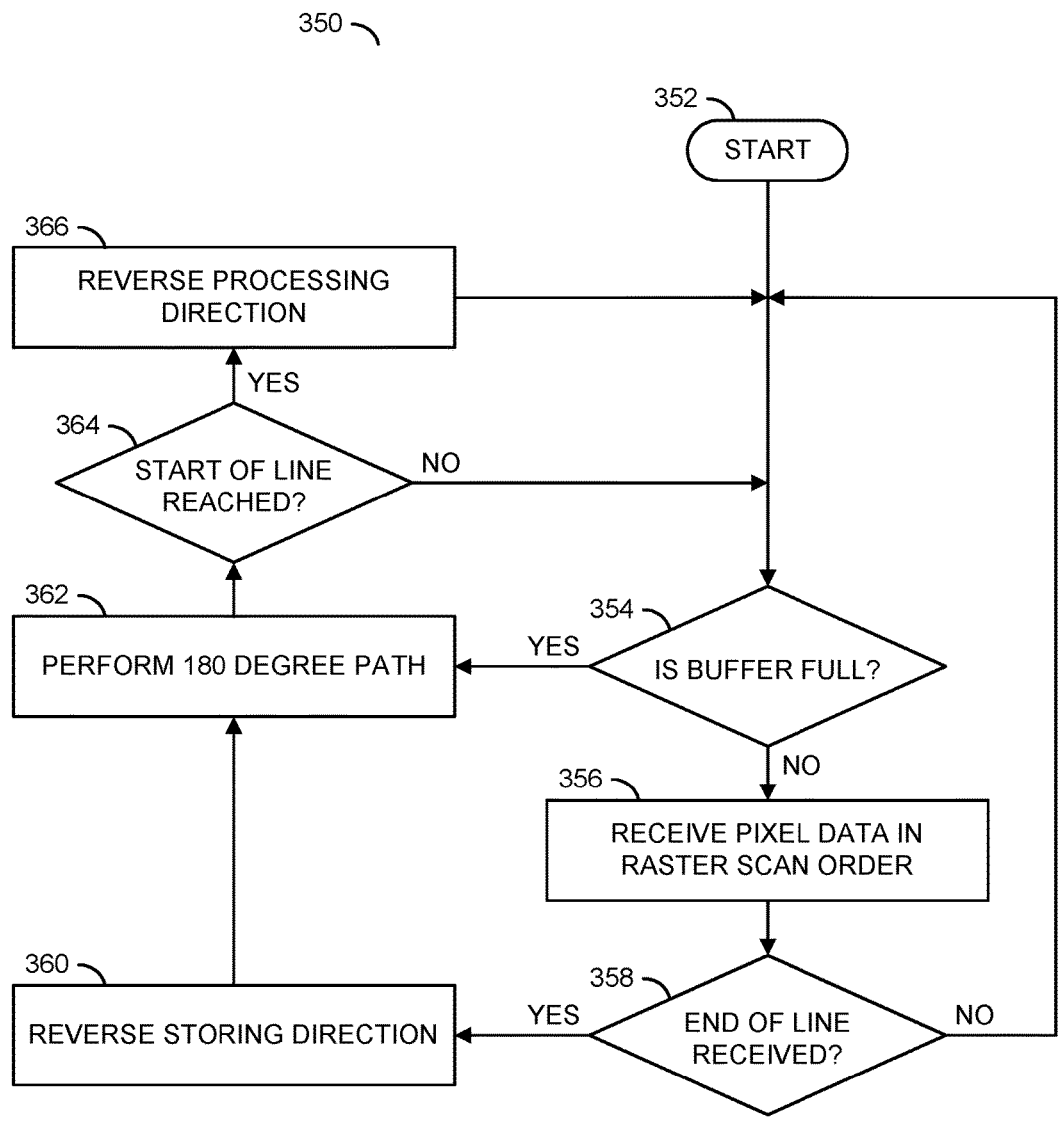
FIG. 8 is a flow diagram illustrating a method for reading pixel data from and writing pixel data to an efficient memory buffer.

Referring to FIG. 8, a method (or process) 350 is shown. The method 350 may read pixel data from and write pixel data to the efficient memory buffers 120a-120n. The method 350 generally comprises a step (or state) 352, a decision step (or state) 354, a step (or state) 356, a decision step (or state) 358, a step (or state) 360, a step (or state) 362, a decision step (or state) 364, and a step (or state) 366.

The state 352 may start the method 350. In the decision state 354, the processor 100 and/or the firmware 130 may determine whether one or more of the buffers 120a-120n are full. If one or more of the buffers 120a-120n are full, the method 350 may move to the state 362. If one or more of the buffers 120a-120n are not full, the method 350 may move to the state 356. In the state 356, the data buffers 120a-120n may receive the pixel data P11-PMN in the raster scan order. Next, the method 350 may move to the decision state 358.

In the decision state 358, the processor 100 and/or the firmware 130 may determine whether the end of the line of the image 150 has been received. If the end of the line of the image 150 has not been received, the method 350 may return to the decision state 354. If the end of the line of the image 150 has been received, the method 350 may move to the state 360. In the state 360, the processor 100 and/or the firmware 130 may reverse the storing direction for incoming pixel data P11-PMN. Next, the method 350 may move to the state 362.

In the state 362, the components 110a-110n of the pipeline 104 may perform the cost calculations for the 180 degree path 180. Next, the method 350 may move to the decision state 364. In the decision state 364, the processor 100 and/or the firmware 130 may determine whether the start of a line of pixel data of the image 150 has been reached. If the start of the line of pixel data of the image 150 has not been reached, the method 350 may return to the decision state 354. If the start of the line of pixel data of the image 150 has been reached, the method 350 may move to the state 366. In the state 366, the processor 100 and/or the firmware 130 may reverse the processing direction for the buffers 120a-120n. Next, the method 350 may return to the decision state 354.

Figure 9:
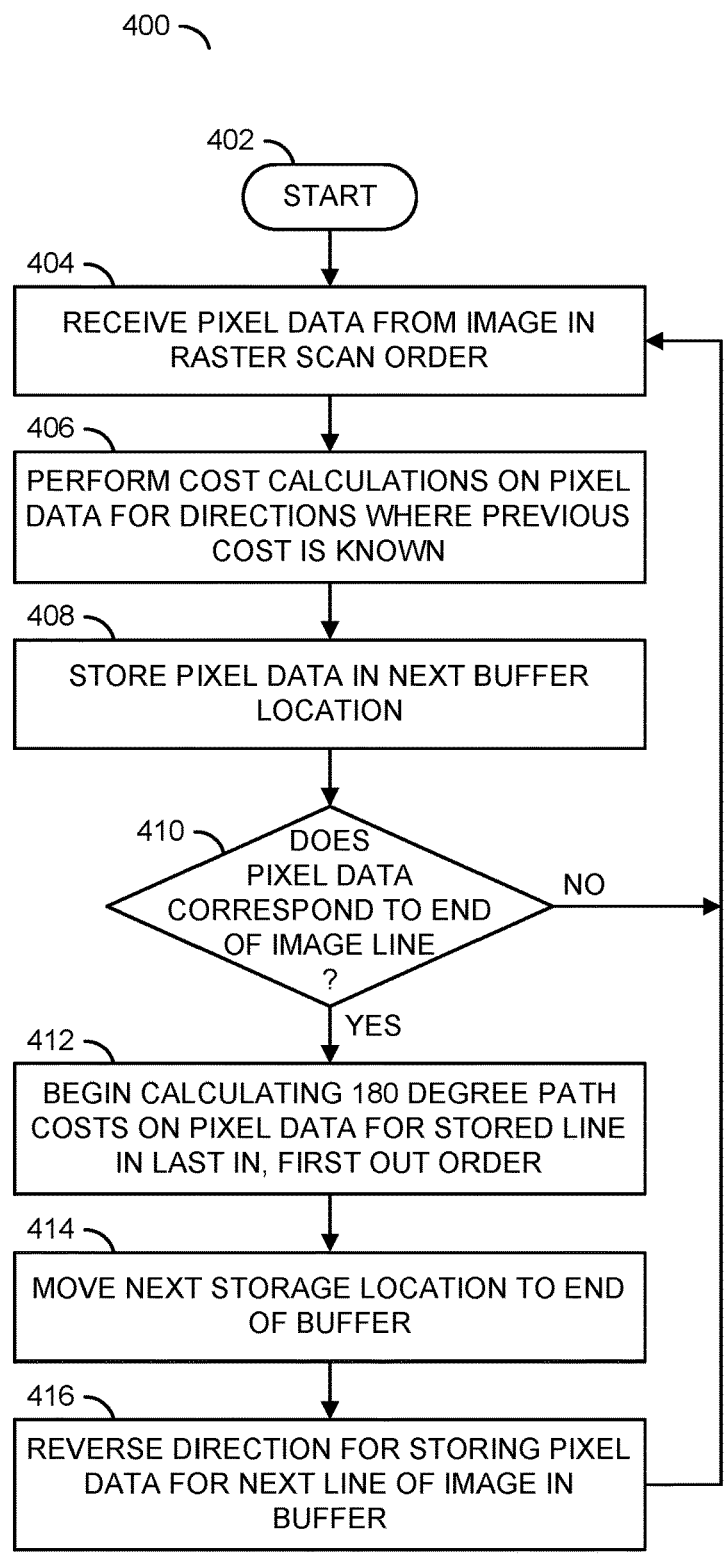
FIG. 9 is a flow diagram illustrating a method for performing stereo reconstruction when the memory buffer is wider than the number of pixels in a line of the image.

Referring to FIG. 9, a method (or process) 400 is shown. The method 400 may perform stereo reconstruction when the memory buffers 120a-120n are wider than the number of pixels in a line of the image 150. The method 400 generally comprises a step (or state) 402, a step (or state) 404, a step (or state) 406, a step (or state) 408, a decision step (or state) 410, a step (or state) 412, a step (or state) 414, and a step (or state) 416.

The state 402 may start the method 400. In the state 404, the pipeline 104 may receive the pixel data P11-PMN of the image 150 in the raster scan order. Next, in the state 406, the components 110a-110n of the pipeline 104 may perform the cost calculations on the pixel data P11-PMN for directions where the previous cost is known (e.g., the paths 160a-160d). In the state 408, the data buffers 120a-120n may store the pixel data P11-PMN in the next storage location 200a-200n of the data buffers 120a-120n. Next, the method 400 may move to the decision state 410.

In the decision state 410, the processor 100 and/or the firmware 130 may determine whether the pixel data corresponds to an end of the line of the image 150 (e.g., determine whether an entire line of pixel data has been written to the data buffers 120a-120n). If the pixel data does not correspond to the end of the line of the image 150, the method 400 may return to the state 404. If the pixel data does correspond to the end of the line of the image 150, the method 400 may move to the state 412.

In the state 412, the components 110a-110n of the pipeline 104 may begin calculating the 180 degree cost calculations for the path 180 (e.g., the pixel data for the line stored in the buffers 120a-120n may be read out in a last in, first out order). Next, in the state 414, the processor 100 and/or the firmware 130 may move the next storage location for newly written pixel data P11-PMN to one of the ends of the buffers 120a-120n (e.g., the first storage location 200a and/or the last storage location 200n). In the state 416, the storage direction for storing the pixel data P11-PMN in the data buffers 120a-120n corresponding to the next line of the image 150 may be reversed. Next, the method 400 may return to the state 404.

Figure 10:
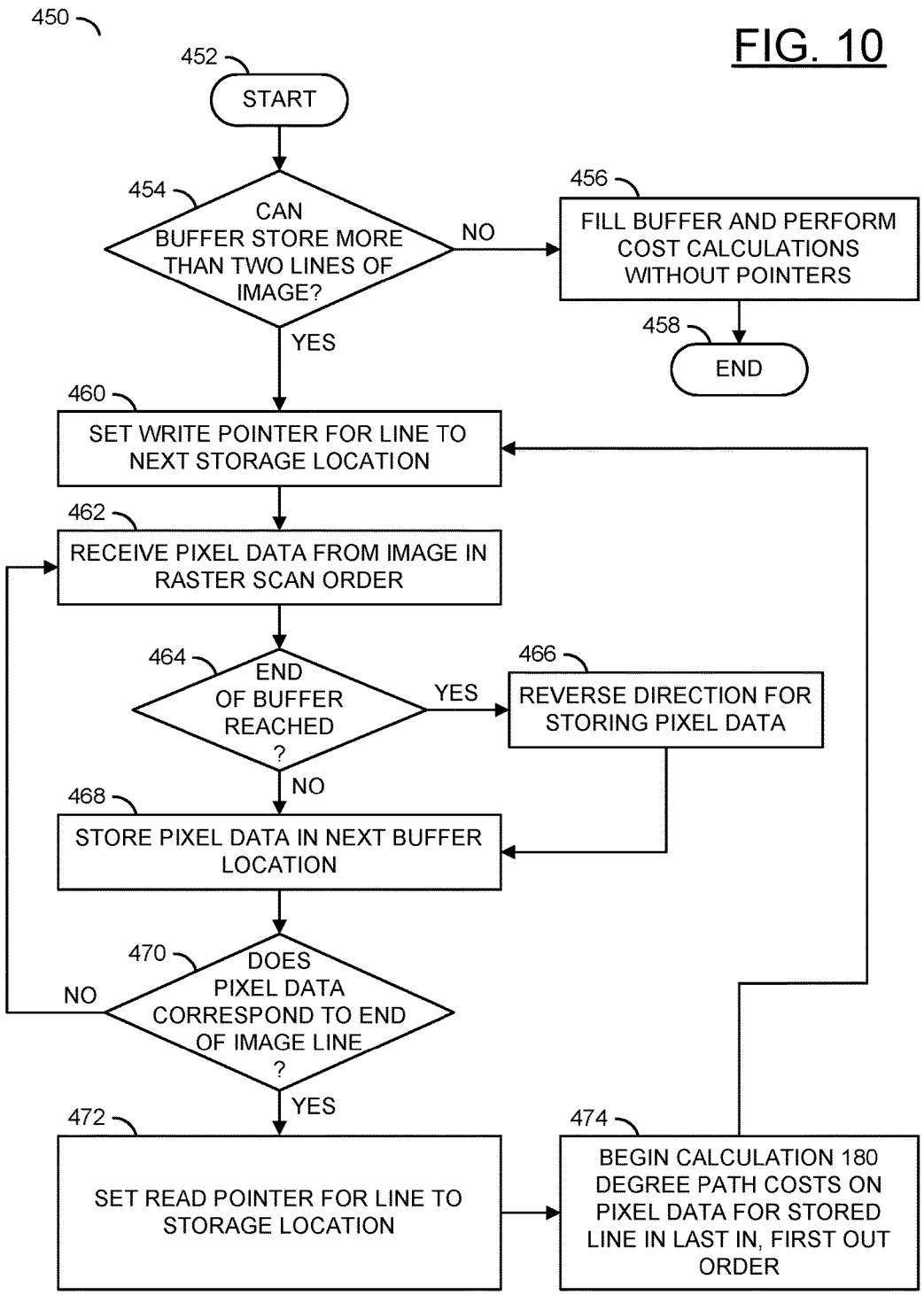
FIG. 10 is a flow diagram illustrating a method for performing stereo reconstruction with the memory buffer using read and write pointers.

Referring to FIG. 10, a method (or process) 450 is shown. The method 450 may perform stereo reconstruction with the memory buffers 120a-120n using read and write pointers. The method 450 generally comprises a step (or state) 452, a decision step (or state) 454, a step (or state) 456, a step (or state) 458, a step (or state) 460, a step (or state) 462, a decision step (or state) 464, a step (or state) 466, a step (or state) 468, a decision step (or state) 470, a step (or state) 472, and a step (or state) 474.

The state 452 may start the method 450. Next, the method 450 may move to the decision state 454. In the decision state 454, the processor 100 and/or the firmware 130 may determine whether the data buffers 120a-120n can store more than two lines of the image 150. For example, a comparison may be made between the width of the image 150 and the number of storage locations 200a-200n of the data buffers 120a-120n. If the buffer can store more than two lines of the image 150, the method 450 may move to the state 460. If the buffer cannot store more than two lines of the image 150, the method 450 may move to the state 456. In the state 456, the pipeline 104 may fill the buffers 120a-120n and/or perform the cost calculations without using the read pointers PTR1-PTRM and/or the write pointers PTW1-PTWM. Next, the method 450 may move to the state 458. The state 458 may end the method 450.

In the state 460, the processor 100 and/or the firmware 130 may set one of the write pointers PTW1-PTWM corresponding to the line of the image 150 to the next available storage location 200a-200n. Next, in the state 462, the data buffers 120a-120n may receive the pixel data P11-PMN from the image 150 in the raster scan order. Next, the method 450 may move to the decision state 464.

In the decision state 464, the processor 100 and/or the firmware 130 may determine whether the end of the buffers 120a-120n have been reached (e.g., whether the next storage location is the first storage location 200a and/or the last storage location 200n). If the end of the buffers 120a-120n have been reached, the method 450 may move to the state 466. In the state 466, the processor 100 and/or the firmware 130 may reverse the direction for storing the pixel data P11-PMN. Next, the method 450 may move to the state 468. In the decision state 464, if the end of the buffers 120a-120n have not been reached, the method 450 may move to the state 468. In the state 468, the buffers 120a-120n may store the incoming pixel data P11-PMN in the next storage locations 200a-200n. Next, the method 450 may move to the decision state 470.

In the decision state 470, the processor 100 and/or the firmware 130 may determine whether the next incoming pixel data P11-PMN corresponds to an end of the line of the image 150. If the pixel data P11-PMN does not correspond to the end of the line of the image 150, the method 450 may return to the state 462. If the pixel data P11-PMN does correspond to the end of the line of the image 150, the method 450 may move to the state 472. In the state 472, the processor 100 and/or the firmware 130 may set the next read pointer PTR1-PTRM corresponding to the next line of the image 150 to the next storage location 200a-200n. Next, in the state 474, the components 110a-110n of the pipeline 104 may begin the 180 degree cost calculations on the pixel data P11-PMN for the stored line of the image 150 corresponding to the path 180 in a last in, first out order. Next, the method 450 may return to the state 460.

The functions and structures illustrated in the diagrams of FIGS. 1 to 10 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method for calculating cost values for pixels in an image, comprising the steps of:
   (A) receiving pixel data from an image in a sequential order, wherein said image has a plurality of lines of said pixels;
   (B) performing a plurality of first cost calculations on said received pixel data;
   (C) storing said received pixel data in a memory buffer in a first direction, wherein (i) said memory buffer comprises a plurality of storage locations and (ii) a number of said storage locations is less than an amount of said pixels in two of said lines;
   (D) when said received pixel data corresponding to an end of a current one of said lines of said pixels of said image is stored, performing a second cost calculation on each of said stored pixel data corresponding to said current line by reading said stored pixel data from said memory buffer from a second direction; and
   (E) storing said received pixel data for a next one of said lines of said pixels in said memory buffer in said second direction, wherein (i) said received pixel data for said next line of said pixels is stored while said second cost calculations are performed on said current line of said pixels and (ii) said stored pixel data for said current line of said pixels is not removed from said memory buffer until said second cost calculation has been performed on said stored pixel data.

2. The method according to claim 1, wherein said memory buffer comprises a single line of said storage locations.

3. The method according to claim 1, wherein said memory buffer implements a reversible memory buffer.

4. The method according to claim 1, wherein said plurality of first cost calculations and said second cost calculation are implemented to perform Semi-Global Matching.

5. The method according to claim 1, wherein (i) said plurality of first cost calculations comprise multiple 1-D paths towards a pixel and (ii) said second cost calculation is a 180 degree cost calculation towards said pixel.

6. The method according to claim 1, wherein said sequential order is a raster scan order.

7. The method according to claim 1, wherein (i) said lines of said pixel data corresponding to said image that are even are (a) stored in said memory buffer from a first address location towards a last address location and (b) read from said memory buffer from a last address location corresponding to said current line towards said first address location and (ii) said lines of said pixel data corresponding to said image that are odd are (a) written to said memory buffer from said last address location towards said first address location and (b) read from said memory buffer from a first address location corresponding to said current line towards said last address location.

8. The method according to claim 1, wherein (i) a width of said memory buffer is larger than said one of said lines of said pixels of said image and (ii) said pixel data corresponding to said next line of said pixels of said image is stored at an end of said memory buffer when a direction of said storing of said received pixel data in said memory buffer is reversed.

9. The method according to claim 1, wherein said method is implemented to estimate distances from a camera using a pair of two dimensional images.

10. The method according to claim 1, wherein said method reduces a number of lines implemented by said memory buffer.

11. The method according to claim 1, wherein said pixel data comprises a derived per-pixel value.

12. The method according to claim 11, wherein said derived per-pixel value comprises at least one of (*a*) pixel descriptors and (b) pixel costs.

13. The method according to claim 1, wherein said pixel data comprises a memory size having a range of 32 bits to 1024 bits.

14. The method according to claim 1, wherein (i) said first direction is from left to right and (ii) said second direction is from right to left.

15. The method according to claim 1, wherein said memory buffer comprises a one line buffer.

16. An apparatus comprising:
   a plurality of image sensors each configured to capture an image, wherein said image has a plurality of lines of pixels; and
   a processor comprising a memory buffer, wherein (A) said processor is configured to (i) receive pixel data from said image in a sequential order, (ii) perform a plurality of first cost calculations on said received pixel data, (iii) store said received pixel data in said memory buffer in a first direction, (iv) when said received pixel data corresponding to an end of a current one of said lines of said pixels of said image is stored, perform a second cost calculation on each of said stored pixel data corresponding to said current line by reading said stored pixel data from said memory buffer from a second direction and (v) store said received pixel data for a next one of said lines in said memory buffer in said second direction, (B) said memory buffer comprises a plurality of storage locations, (C) a number of said storage locations is less than an amount of said pixels in two of said lines, (D) said received pixel data for next line of said pixels is stored while said second cost calculations are performed on said current line of said pixels and (E) said stored pixel data for said current line of said pixels is not removed from said memory buffer until said second cost calculation has been performed on said stored pixel data.

17. A method for calculating cost values for pixels in an image, comprising the steps of:
   (A) receiving pixel data from an image in a sequential order;
   (B) performing a plurality of first cost calculations on said received pixel data;
   (C) storing said received pixel data in a memory buffer in a direction;
   (D) when said received pixel data corresponding to an end of a line of said pixels of said image is stored, performing a second cost calculation on each of said stored pixel data corresponding to said line, wherein an order for said second cost calculations on said line of said stored pixel data is last in, first out; and
   (E) reversing said direction of said storing of said received pixel data in said memory buffer, wherein (i) said received pixel data is stored while said second cost calculations are performed, (ii) said stored pixel data is not removed from said memory buffer until said second cost calculation has been performed on said stored pixel data, (iii) even lines of said pixel data corresponding to said image are (a) stored to said memory buffer from a first address location to a last address location and (b) read from said memory buffer from said last address location to said first address location and (iv) odd lines of said pixel data corresponding to said image are (a) stored to said memory buffer from said last address location to said first address location and (*b*) read from said memory buffer from said first address location to said last address location.

* * * * *